(12) United States Patent
Ishii

(10) Patent No.: US 7,379,760 B2
(45) Date of Patent: May 27, 2008

(54) DATA TRANSMISSION-RECEPTION SYSTEM AND DATA TRANSMISSION-RECEPTION METHOD

(75) Inventor: Miruka Ishii, Tokyo (JP)

(73) Assignee: Sony Corporation, Tokyo (JP)

( * ) Notice: Subject to any disclaimer, the term of this patent is extended or adjusted under 35 U.S.C. 154(b) by 1295 days.

(21) Appl. No.: 10/037,329

(22) Filed: Nov. 9, 2001

(65) Prior Publication Data

US 2002/0154759 A1    Oct. 24, 2002

(30) Foreign Application Priority Data

Nov. 10, 2000    (JP)    ............................. 2000-344493

(51) Int. Cl.
*H04B 1/38*    (2006.01)
(52) U.S. Cl. ..................... 455/567; 455/405; 455/406; 455/412.2; 455/414.1; 455/458; 455/401; 379/164; 379/179; 379/252; 379/373.01; 379/373.02; 379/373.04; 379/374.01; 379/374.02; 705/14
(58) Field of Classification Search ........ 455/405–409, 455/414.1, 414.2, 401, 412.1, 412.2, 458; 455/567; 379/114.12, 114.17, 114.16, 114.1, 379/114.2, 121.02, 373.01–373.04, 374.01, 379/374.02, 67.1, 70, 164, 179, 201.01, 252; 705/14

See application file for complete search history.

(56) References Cited

U.S. PATENT DOCUMENTS

| | | | | |
|---|---|---|---|---|
| 4,811,382 A | * | 3/1989 | Sleevi | .......................... 379/67.1 |
| 4,850,007 A | * | 7/1989 | Marino et al. | ......... 379/114.13 |
| 5,333,186 A | * | 7/1994 | Gupta | .................... 379/114.09 |
| 5,353,335 A | * | 10/1994 | D'Urso et al. | ............ 379/114.2 |
| 5,452,354 A | * | 9/1995 | Kyronlahti et al. | ..... 379/373.02 |
| 5,539,809 A | * | 7/1996 | Mayer et al. | ........... 379/210.02 |
| 5,652,784 A | * | 7/1997 | Blen et al. | .................. 379/67.1 |
| 5,724,521 A | * | 3/1998 | Dedrick | ......................... 705/26 |
| 5,852,775 A | * | 12/1998 | Hidary | ..................... 455/412.1 |
| 5,931,901 A | * | 8/1999 | Wolfe et al. | ................. 709/206 |
| 5,937,037 A | * | 8/1999 | Kamel et al. | ............. 379/88.19 |
| 5,987,424 A | * | 11/1999 | Nakamura | .................... 705/14 |
| 6,009,150 A | * | 12/1999 | Kamel | ...................... 379/88.22 |
| 6,018,654 A | * | 1/2000 | Valentine et al. | ......... 455/414.4 |
| 6,018,720 A | * | 1/2000 | Fujimoto | ...................... 705/26 |
| 6,094,587 A | * | 7/2000 | Armanto et al. | ............ 455/567 |
| 6,181,927 B1 | * | 1/2001 | Welling et al. | ........... 455/414.1 |
| 6,304,651 B1 | * | 10/2001 | Cramer et al. | ......... 379/221.01 |

(Continued)

*Primary Examiner*—William Trost
*Assistant Examiner*—James D Ewart
(74) *Attorney, Agent, or Firm*—Finnegan, Henderson, Farabow, Garrett, Dunner, L.L.P.

(57) ABSTRACT

A data communication system is disclosed which comprises: first terminal devices for transmitting contents and content provider identification data identifying the providers of the contents; a server device for receiving and storing the transmitted contents and content provider identification data; and second terminal devices which transmit user identification data to the server device, which receive and store the contents from the server device based on the user identification data, and which reproduce the stored contents upon detection of an incoming call. The server device stores first account information corresponding to the content provider identification data and second account information corresponding to the user identification data. The server device increments first amount information in the first account information when receiving the contents from the first terminal devices; the server device decrements second amount information in the second account information when transmitting the contents to the second terminal devices.

29 Claims, 9 Drawing Sheets

U.S. PATENT DOCUMENTS

| | | | |
|---|---|---|---|
| 6,366,791 B1 * | 4/2002 | Lin et al. | 455/567 |
| 6,385,308 B1 * | 5/2002 | Cohen et al. | 379/88.23 |
| 6,418,330 B1 * | 7/2002 | Lee | 455/567 |
| 6,442,244 B1 * | 8/2002 | Fellingham et al. | 379/76 |
| 6,442,529 B1 * | 8/2002 | Krishan et al. | 705/14 |
| 6,484,148 B1 * | 11/2002 | Boyd | 705/14 |
| 6,493,437 B1 * | 12/2002 | Olshansky | 379/114.13 |
| 6,553,178 B2 * | 4/2003 | Abecassis | 386/83 |
| 6,567,854 B1 * | 5/2003 | Olshansky et al. | 709/229 |
| 6,603,844 B1 * | 8/2003 | Chavez et al. | 379/114.13 |
| 6,606,376 B1 * | 8/2003 | Trell | 379/102.06 |
| 6,618,474 B1 * | 9/2003 | Reese | 379/142.17 |
| 6,816,878 B1 * | 11/2004 | Zimmers et al. | 709/200 |
| 6,862,445 B1 * | 3/2005 | Cohen | 455/412.1 |
| 7,035,907 B1 * | 4/2006 | Decasper et al. | 709/212 |
| 7,039,599 B2 * | 5/2006 | Merriman et al. | 705/14 |
| 7,072,867 B2 * | 7/2006 | Dutta | 705/53 |
| 7,149,471 B1 * | 12/2006 | Arisawa et al. | 455/3.04 |
| 7,187,761 B2 * | 3/2007 | Bookstaff | 379/201.01 |
| 2001/0032193 A1 * | 10/2001 | Ferber | 705/79 |
| 2001/0034651 A1 * | 10/2001 | Marks et al. | 705/14 |
| 2001/0048737 A1 * | 12/2001 | Goldberg et al. | 379/114.13 |
| 2001/0051517 A1 * | 12/2001 | Strietzel | 455/414 |
| 2001/0056374 A1 * | 12/2001 | Joao | 705/14 |
| 2002/0042777 A1 * | 4/2002 | Yoshida et al. | 705/41 |
| 2002/0087656 A1 * | 7/2002 | Gargiulo et al. | 709/217 |
| 2003/0050837 A1 * | 3/2003 | Kim | 705/14 |
| 2003/0086558 A1 * | 5/2003 | Seelig et al. | 379/373.01 |
| 2004/0105534 A1 * | 6/2004 | Dezonno | 379/114.13 |

* cited by examiner

FIG.8

| PROVIDER ID | MUSIC DATA NAME |
|---|---|
| A | a a a a |
| B | b b b b |
| C | c c c c |
| D | d d d d |
| E | a b c d |
| · | · |
| · | · |
| · | · |

DOWNLOAD

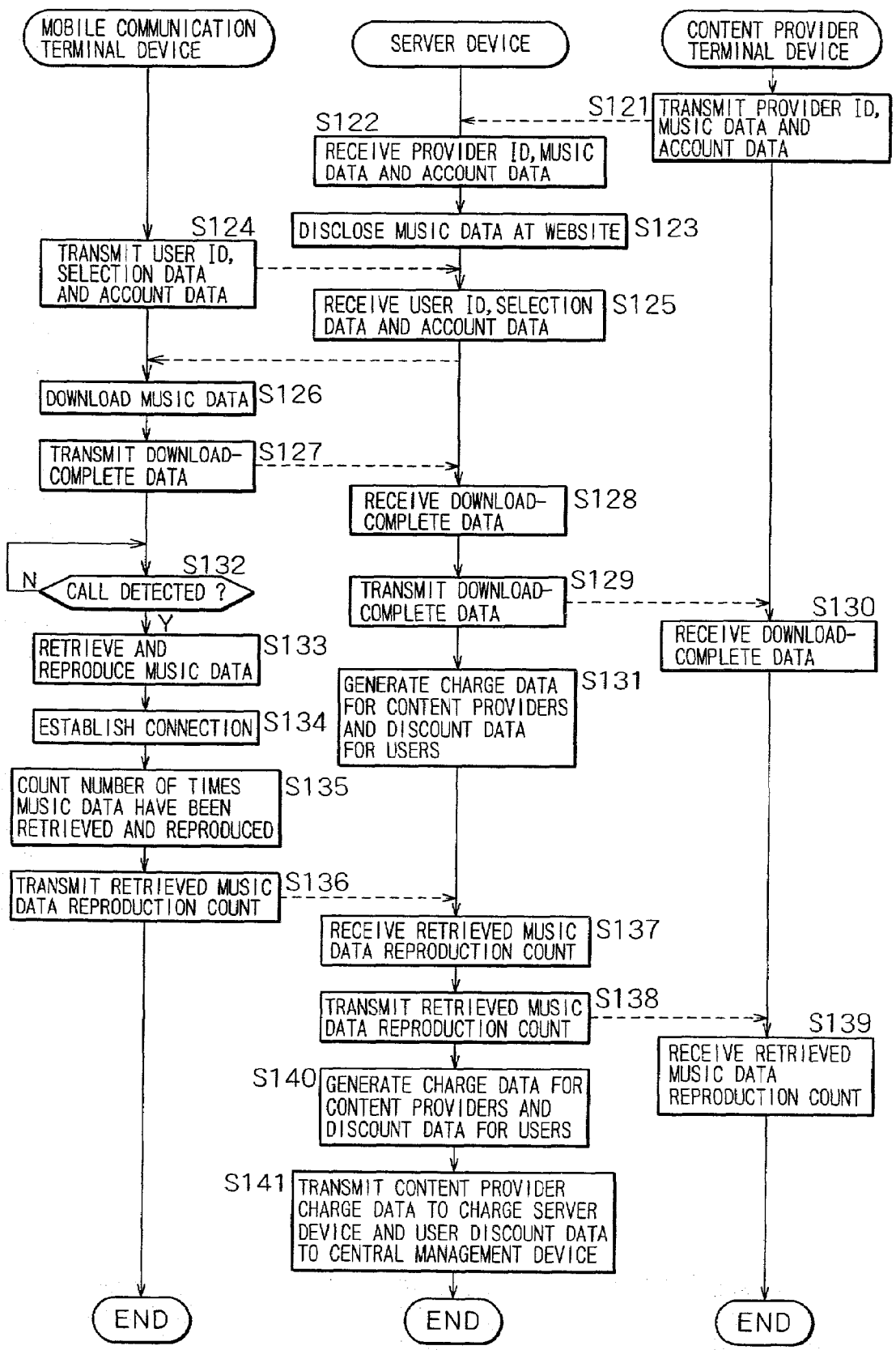

DATA TRANSMISSION-RECEPTION SYSTEM AND DATA TRANSMISSION-RECEPTION METHOD

BACKGROUND OF THE INVENTION

The present invention relates to a system and a method for data transmission and reception whereby music data or the like provided by sponsors are downloaded to terminal devices such as mobile communication terminals for use as a ring tone, as well as to a server device and communication terminal devices for use with the system.

Already, some mobile communication terminal devices such as portable telephones are capable of employing users' favorite music data as a ring tone. This type of mobile communication terminal devices accommodates music data in a semiconductor memory or like storage medium so that users may select a preferred piece of music from the data stored therein. The music data thus selected are reproduced by the device as a ring tone upon detection of an incoming call.

Since the ring tone alerting the telephone user to an incoming call is reproduced loud enough to be heard by the user, the tone may also be heard by people near the owner of the mobile communication terminal device. It follows that music data used by telephone users as ring tones can work as an advertisement that helps promote acceptance of particular pieces of music by the public.

This state of affairs is advantageous to performers involved with the music in question and to agencies or similar organizations that promote their activities. Users, on the other hand, have yet to receive any financial benefits in return for their unwitting advertising campaign.

SUMMARY OF THE INVENTION

The present invention has been made in view of the above circumstances and provides a data transmission-reception system and a data transmission-reception method for allowing content providers such as advertisers to transmit contents such as music data from first terminal devices to a server device over a network such as the Internet so that users may later download the contents by means of second terminal devices such as mobile communication terminal devices for use as a ring tone, whereby both the content providers and the users see their due benefits realized in a balanced manner.

In carrying out the invention and according to a first aspect thereof, there is provided a data communication system including:

a first terminal device for transmitting content and content provider identification data identifying the provider of said content;

a server device for receiving and storing the transmitted content and content provider identification data; and a second terminal device which transmit user identification data to said server device, which receives and stores said content from said server device based on said user identification data, and which reproduces the stored content upon detection of an incoming call;

wherein said server device stores first account information corresponding to said content provider identification data and second account information corresponding to said user identification data, said server device incrementing first amount information in said first account information when receiving said content from said first terminal device, said server device decrementing second amount information in said second account information when transmitting said content to said second terminal device.

According to a second aspect of the invention, there is provided a server device including:

communicating means for receiving from a first terminal device content and content provider identification data identifying the provider of said content;

storing means for storing the content received through said communicating means in correspondence with said content provider identification data; and controlling means for transmitting said content through said communicating means to a second terminal device based on user identification data received from said second terminal device;

wherein said storing means stores first account information corresponding to said content provider identification data and second account information corresponding to said user identification data; and wherein said controlling means increments first amount information in said first account information when receiving said content from said first terminal device through said communicating means, and decrements second amount information in said second account information when transmitting said content to said second terminal device through said communicating means.

According to a third aspect of the invention, there is provided a communication terminal device including:

communicating means for transmitting user identification data to a server device and exchanging call data with said server device;

storing means for storing content which is offered by content provider and which is transmitted from said server device in accordance with said user identification data;

reproducing means for reproducing said content; and controlling means which retrieves said content from said storing means upon detection of incoming call data and causes said reproducing means to reproduce the retrieved content.

According to a fourth aspect of the invention, there is provided a data communication method including the steps of:

allowing a first terminal device to transmit to a server device a content and content provider identification data identifying the provider of said content;

allowing a second terminal device to transmit user identification data to said server device;

allowing said server device to receive and store said content, said content provider identification data, and said user identification data;

allowing said server device which stores first account information corresponding to said content provider identification data and second account information corresponding to said user identification data; to increment first amount information in said first account information when receiving said content from said first terminal device; to transmit said content to said second terminal device based on said user identification data; and to decrement second amount information in said second account information upon transmission of said content to said second terminal device;

allowing said second terminal device to receive and store the transmitted content; and allowing said second terminal device to reproduce said content upon detection of an incoming call.

According to a fifth aspect of the invention, there is provided a data communication method including the steps of:

allowing a server device to receive from a first terminal device a content and content provider identification data identifying the provider of said content, and to receive and store user identification data from a second terminal device; and allowing said server device which stores first account information corresponding to said content provider identification data and second account information corresponding to said user identification data; to increment first amount information in said first account information when receiving said content from said first terminal device; to transmit said content to said second terminal device based on said user identification data; and to decrement second amount information in said second account information upon transmission of said content to said second terminal device.

According to a sixth aspect of the invention, there is provided a data communication method including the steps of:

allowing a communication terminal device to transmit user identification data to a server device;

allowing said communication terminal device to store a content which is offered by a content provider and which is transmitted from said server device in accordance with said user identification data; and allowing said communication terminal device to retrieve the stored content upon detection of incoming call data and to reproduce the retrieved content.

According to a seventh aspect of the invention, there is provided a storage medium which stores a data communication method program including the steps of:

allowing a server device to receive from a first terminal device a content and content provider identification data identifying the provider of said content, and to receive and store user identification data from second terminal device; and allowing said server device which stores first account information corresponding to said content provider identification data and second account information corresponding to said user identification data; to increment first amount information in said first account information when receiving said content from said first terminal device; to transmit said content to said second terminal device based on said user identification data; and to decrement second amount information in said second account information upon transmission of said content to said second terminal device.

According to a eighth aspect of the invention, there is provided a storage medium which stores a data communication method program including the steps of:

allowing a communication terminal device to transmit user identification data to a server device;

allowing said communication terminal device to store a content which is offered by a content provider and which is transmitted from said server device in accordance with said user identification data; and allowing said communication terminal device to retrieve the stored content upon detection of incoming call data and to reproduce the retrieved content.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a schematic view of a typical screen for allowing a user to download music data selectively; and FIG. 9 is a flowchart of steps in which another data transmission-reception system according to the invention allows a user of a mobile communication terminal device to select music data on a display screen when downloading the data for use as a ring tone.

DESCRIPTION OF THE PREFERRED EMBODIMENTS

Preferred embodiments of the data transmission-reception system according to the invention will now be described with reference to the accompanying drawings. The inventive system involves allowing mobile communication terminal devices to download music data from sponsors for use as ring tones so that users of the mobile communication terminal devices, in return for employing the music data as their ring tones, have their call charges reduced correspondingly.

Figure 1:
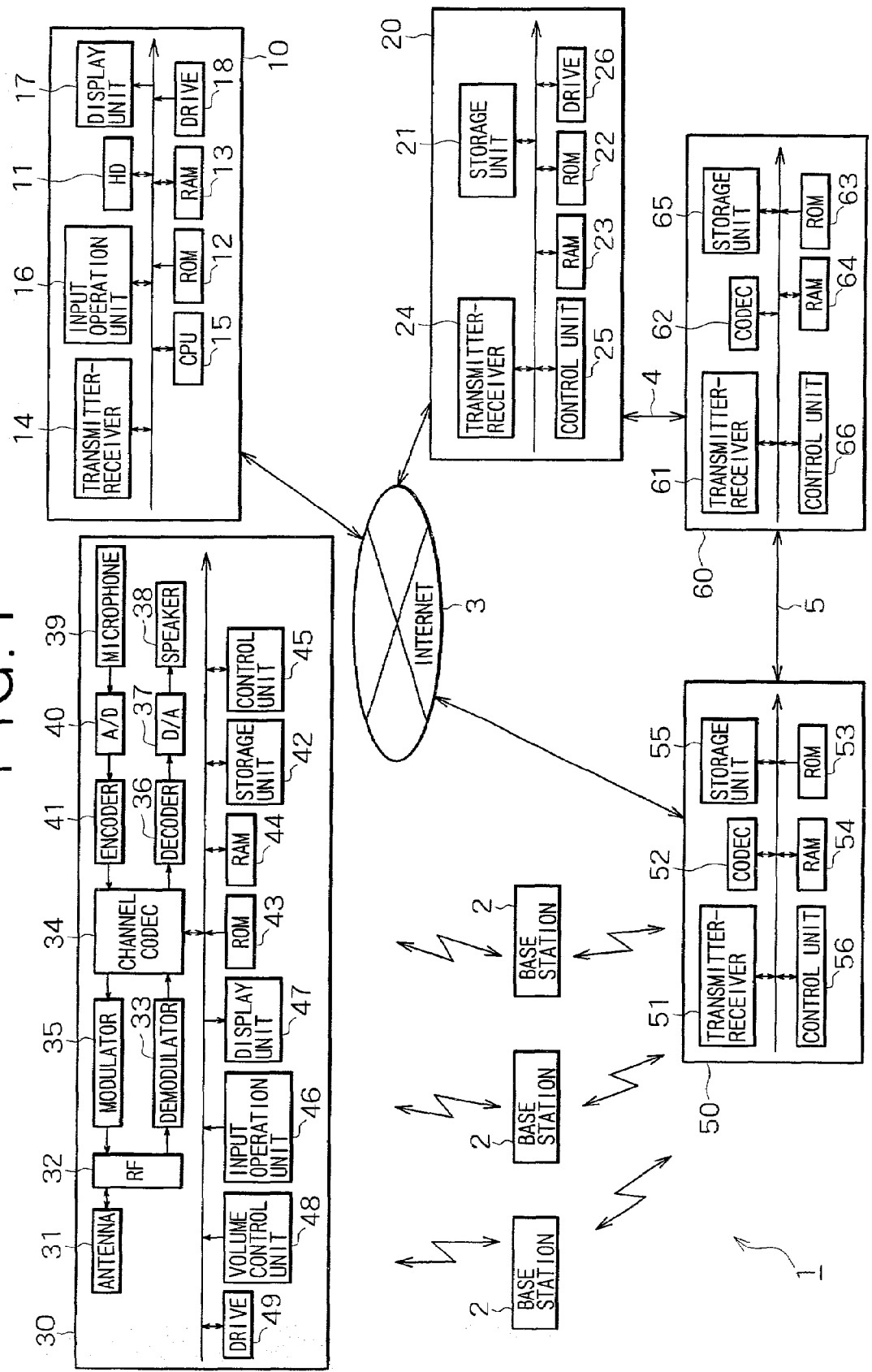
FIG. 1 is a block diagram of a typical data transmission-reception system according to the invention.

As shown in FIG. 1, the data transmission-reception system 1 comprises content provider terminal devices 10, a server device 20, and mobile communication terminal devices 30. The content provider terminal devices 10 are installed at sponsors' places such as agencies and record companies. The server device 20 stores music data uploaded from the content provider terminal devices 10. The mobile communication terminal devices 30 gain access to the server device 20 to download the music data therefrom. The data transmission-reception system 1 also includes a central management device 50 that provides overall control of a wireless communication network made up of the mobile communication terminal devices 30. Each mobile communication terminal device 30 is connected to the central management device 50 via a base station 2. The content provider terminal devices 10 and central management device 50 are connected to the server device 20 run by an Internet service provider on the Internet 3 by way of telecommunication lines such as ISDN (Integrated Services Digital Network), CATV (cable television) or optical cable lines. In other words, the mobile communication terminal devices 30 are connected to the server device 20 via the central management device 50 over the Internet 3.

The data transmission-reception system 1 has a charge server device 60 that settles call charges and other fees associated with the mobile communication terminal devices 30. The server device 20 is connected to the charge server device 60 by means of a leased line 4, and the central management device 50 is connected to the charge server device 60 by way of a leased line 5.

The content provider terminal devices 10 installed at sponsors' places such as agencies and record companies are each structured substantially as an ordinary personal computer. As such, the content provider terminal device 10 comprises a hard disk (HD) 11 that retains music data as targets to be advertised and stores various application programs such as a browser for browsing websites established by the server device 20; a read-only memory (ROM) 12 that accommodates control programs for controlling the device as a whole; a random-access memory (RAM) 13 into which programs are loaded from the HD 11 or ROM 12; a transmitter-receiver 14 for exchanging data with the server device 20; and a central processing unit (CPU) 15 that controls the whole device based on the programs loaded into the RAM 13. The content provider terminal device 10 further includes an input operation unit 16 made up of a keyboard, a mouse, a touch panel, etc., through which to make data entries; a display unit 17 for displaying website pages or the like downloaded from the server device 20; and a drive 18 that drives an external storage unit accommodating a storage medium such as an optical disc, a magneto-optical disc, a magnetic disc, an IC card, a tape cassette or a disc cartridge.

The content provider terminal device 10 of the above-described constitution allows a person in charge at a sponsor's place to enter a start command through the input operation unit 16 to start a desired application program from among those stored on the HD 11. In response, the CPU 15 loads the required program into the RAM 13 from the HD 11 or ROM 12 for execution.

Suppose that the person in charge at the sponsor's place wants to browse a website set up by the server device 20. In that case, the person operates the input operation unit 16 to enter a URL (uniform resource locator) designating the location of the website in question. In turn, the CPU 15 executes the browser program and transmission protocols such as TCP/IP (Transmission Control Protocol/Internet Protocol) to access the server device 20 over the Internet 3, and downloads the desired website pages for display on the display unit 17.

When uploading music data such as a sampler of a new release by a currently publicized artist to the server device 20, the person at the sponsor's place first designates a suitable URL by operating the input operation unit 16 to gain access to the server device 20. Once a connection is established with the server device 20, a file containing the music data in question which is located on the HD 11 or in an external storage unit attached to the drive 18 is designated and transmitted to the server device 20. At this point, the content provider terminal device 10 transmits not only the content made up of the music data but also a provider ID, i.e., provider identification data indicating who offered the content. The content provider terminal device 10 further transmits to the server device 20 account data about the sponsor such as a promoter's agency or a record company offering the content so that the sponsor may later be charged with advertising fees.

The music data to be uploaded to the server device 20 need not constitute an entire piece of music since the data are used solely as a ring tone of the mobile communication terminal device 30. The music data may typically be composed of an introductory part of a given piece of music or any other passage thereof that is the most memorable.

The content provider terminal device 10 may have necessary application programs installed by attaching an external storage unit containing the programs to the drive 18 and retrieving them from the attached unit. Alternatively, the application programs may be installed by having them downloaded from appropriate locations through the transmitter-receiver 14.

The server device 20 to which music data to be advertised are uploaded from the content provider terminal devices 10 is structured as an ordinary computer. That is, the server device 20 typically comprises a storage unit 21 that retains websites and application programs; a ROM 22 that stores control programs for controlling overall operations; a RAM 23 into which programs are loaded from the storage unit 21 or ROM 22; a transmitter-receiver 24 for exchanging data with the content provider terminal devices 10 and with the central management device 50; a control unit 25 that controls overall operations based on the programs loaded into the RAM 23 from the storage unit 21 or ROM 22; and a drive 26 to which an external storage unit is attached.

The storage unit 21 is illustratively constituted by a mass storage hard disk that retains a website to be accessed primarily by the content provider terminal devices 10 for uploading music data as advertising material, as well as a website where the uploaded music data are disclosed in a manner downloadable by the mobile communication terminal devices 30 mainly via the central management device 50. A database held in the storage unit 21 stores the music data uploaded from the content provider terminal devices 10 in correspondence with provider IDs identifying the music data providers.

When music data are uploaded from a content provider terminal device 10, the server device 20 receives the data through the transmitter-receiver 24 and stores them as a content in the database of the storage unit 21 in association with the corresponding provider ID. On receiving a request signal from a mobile communication terminal device 30 requesting downloading of music data as a ring tone, the server device 20 causes its control unit 25 to transmit the music data corresponding to the request signal to the terminal device 30.

The server device 20 may have necessary application programs installed by attaching an external storage unit containing the programs to the drive 26 and retrieving them from the attached unit. Alternatively, the application programs may be installed by having them downloaded from appropriate locations through the transmitter-receiver 24.

The mobile communication terminal device 30 that gains access to the server device 20 to download music data therefrom is typically a portable telephone. As such, the mobile communication terminal device 30 comprises an antenna 31 for exchanging data with a base station 2; an RF unit 32 that amplifies data to be exchanged; a demodulator 33 that demodulates data illustratively having undergone QPSK (quadrature frequency shift keying); a channel CODEC 34 that decodes voice data and music data out of those channel-coded illustratively by TDMA (time division multiple access) and codes data by the same method for transmission; and a modulator 35 that subjects outgoing data to QPSK or like method for modulation.

The mobile communication terminal device 30 also includes a decoder 36 that decodes by ADPCM (adaptive differential pulse code modulation) or similar method the voice data extracted by the channel CODEC 34; a D/A converter 37 that converts the voice data decoded by the decoder 36 from digital to analog format; a speaker 38 that outputs voice data in analog format; a microphone 39 that converts voice into electrical signals; an A/D converter 40 that converts voice data from analog to digital format; and an encoder 41 that encodes the digitized voice data by ADPCM or the like.

The mobile communication terminal device 30 further comprises a storage unit 42 made up of a semiconductor memory such as a flash memory that retains music data downloaded from the server device 20 for use as a ring tone; a ROM 43 that stores control programs or the like for controlling overall operations; a RAM 44 into which data are loaded from the storage unit 42 or ROM 43; a control unit 45 that controls overall operations based on the control programs loaded into the RAM 44; an input operation unit 46 constituted by numeric keys and other controls for entering telephone numbers, URLs and characters; a display unit 47 illustratively composed of a liquid crystal display panel for displaying the other party's telephone number and website pages; a volume control unit 48 that permits stepped adjustment of reproduction volume of the ring tone or the like; and a drive 49 that accommodates a small external storage unit such as an IC card.

When a user utilizes the mobile communication terminal device 30 of the above constitution as a portable telephone, the device 30 works as follows: upon detecting an incoming call signal, the control unit 45 retrieves music data from the storage unit 42 for use as a ring tone and causes the decoder 36 to decode the data. The decoded data are converted from digital to analog format by the D/A converter 37 before being output from the speaker 38. The volume of the ring tone is controlled by the control unit 45 in keeping with the volume level set on the volume control unit 48. When the user pushes an off-hook button on the input operation unit 46, the control unit 45 establishes a connection with a base station 2. Call data sent from the base station 2 are received by the antenna 31, amplified by the RF unit 32, and demodulated by the demodulator 33. The channel CODEC 34 extracts voice data from the demodulated data. The extracted voice data are decoded by the decoder 36 and converted to analog format by the D/A converter 37 before being output from the speaker 38. The voice data may be output alternatively from headphones or from an earphone in place of the speaker 38.

The voice spoken by the user is converted to an analog signal by the microphone 39 before being converted to a digital signal by the A/D converter 40. The digitized voice data are encoded by the encoder 41 and channel-coded by the channel CODEC 34. The voice data are then modulated by the modulator 35, amplified by the RF unit 32 and transmitted from the antenna 31 to the base station 2.

Suppose now that the user operating the mobile communication terminal device 30 browses the website established by the server device 20 and wants to download music data therefrom for use as a ring tone. In that case, the user first enters a suitable URL by operating the input operation unit 46 and pushes a send button on the unit 46. This causes the control unit 45 to transmit an outgoing call signal to the base station 2. Once a connection is established with the base station 2, the control unit 45 downloads the desired website page and displays it on the display unit 47.

The mobile communication terminal device 30 proceeds to admit desired music data downloaded from the server device 20 as follows: the music data are received by the antenna 31, amplified by the RF unit 32 and demodulated by the demodulator 33. The channel CODEC 34 extracts the music data from the demodulated data and stores the extracted data into the storage unit 42. The music data placed in the storage unit 42 are later used as the ring tone. When detecting an incoming call, the control unit 45 retrieves the music data from the storage unit 42 and reproduces the retrieved data. The control unit 45 inhibits deletion of any music data downloaded from the server device 20. Specifically, a delete-inhibit flag detected by the control unit 45 from the downloaded music data prevents the user from deleting the data at will. This is to make sure that the music data remain effective as an advertisement. The delete-inhibit flag is represented illustratively by the URL of the location from which the music data are downloaded for use as a ring tone. The URL is utilized as the flag in this type of service because the URL best represents the location to be accessed by the user trying to download the music data for use as a ring tone of the mobile communication terminal device 30.

On the mobile communication terminal device 30, the user may download necessary application programs by attaching an external storage unit containing the programs to the drive 49 and retrieving them from the attached unit. Alternatively, the application programs may be installed into the storage unit 42 by having them downloaded from appropriate locations.

The central management device 50 manages the entire wireless communication network made up of the mobile communication terminal devices 30. As such, the central management device 50 typically comprises a transmitter-receiver 51 that exchanges data with the base stations 2 and with the server device 20; a CODEC 52 that encodes and decodes data; a ROM 53 that stores control programs and the like for controlling overall operations; a RAM 54 into which the control programs are loaded from the ROM 53 or other locations; a storage unit 55 that accommodates call management data and other data about the mobile communication terminal devices 30; and a control unit 56 that controls overall operations based on the programs loaded into the RAM 54.

The central management device 50 is designed to control a plurality of base stations 2 and to act as an exchange permitting calls between the mobile communication terminal devices 30. The device 50 also retains call fee data calculated on the basis of call times run up by individual users of the mobile communication terminal devices 30, as well as account access key data for gaining access to account data held by the charge server device 60. The central management device 50 further permits bidirectional communication of digital data such as music data with the server device 20.

The charge server device 60 for settling accounts comprises a transmitter-receiver 61 that exchanges data with the server device 20 and with the central management device 50; a CODEC 62 that encodes and decodes data; a ROM 63 that stores control programs and the like for controlling overall operations; a RAM 64 into which the programs are loaded from the ROM 63 or other locations; a storage unit 65 that retains account data and other data; and a control unit 66 that controls overall operations based on the programs loaded into the RAM 64.

In the charge server device 60, the storage unit 65 retains account data on the music data providers as well as account data on the users of the mobile communication terminal devices 30. Upon receipt of an access request or account key data from the server device 20 or from the central management device 50, the charge server device 60 causes its control unit 66 to carry out an authentication process on what has been received. When the request or data in question are duly authenticated, the charge server device 60 updates the applicable account data.

Figure 2:
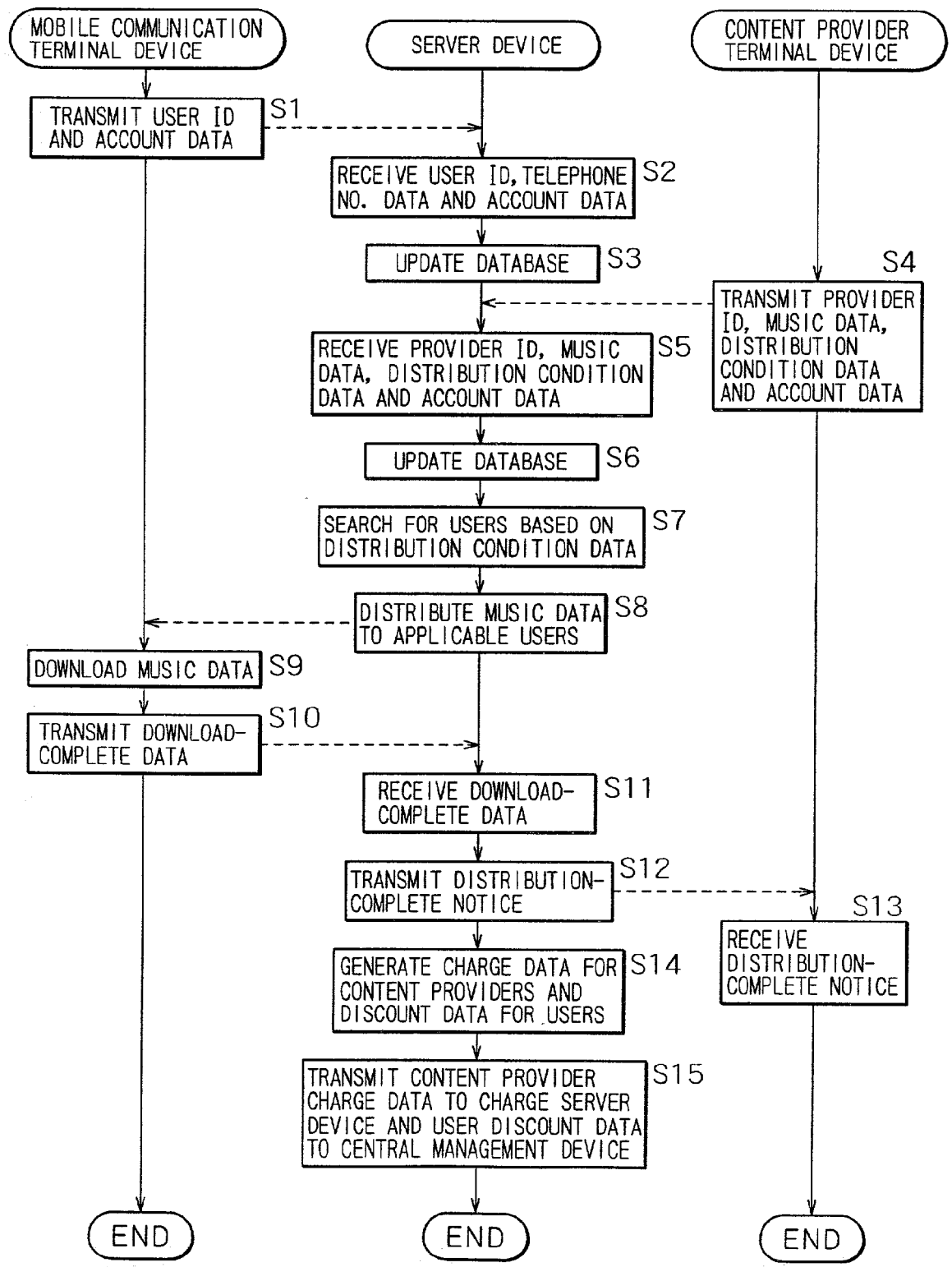
FIG. 2 is a flowchart of steps in which a user of a mobile communication terminal device makes user registration with a server device, in which a content provider transmits music data to the server device, and in which the terminal device user downloads the music data from the server device for use as a ring tone.

Described below with reference to FIG. 2 is how a user of a mobile communication terminal device 30 makes user registration with the server device 20 preparatory to utilizing this service, how content providers transmit music data to the server device 20, and how the user downloads the music data from the server device 20 for use as a ring tone.

To utilize this service, the user of the mobile communication terminal device 30 makes user registration with the server device 20 as follows: in step S1 of FIG. 2, the mobile communication terminal device 30 transmits to the server device 20 such user data as the address, age, gender, and account number data entered by the user operating the input operation unit 46. In step S2, the server device 20 receives the data from the mobile communication terminal device 30. In step S3, the server device 20 updates the database in the storage unit 21. More specifically, as shown in Table 1 below, the control unit 25 of the server device 20 grants a user ID (A, B, C, etc.) to each user making user registration. The control unit 25 updates the database by inputting the user data such as the telephone number, age and gender in correspondence with each user ID.

The music data provider uploads music data to the server device 20 for advertising purposes as follows: in step S4, the music data to be advertised are uploaded to the server device 20 from the content provider terminal device 10 manned by a worker operating the input operation unit 16 at the sponsor's place such as a promoter's agency or a record company. At this point, the content provider terminal device 10 transmits not only the music data but also distribution conditions, i.e., conditions to be met prior to distribution of the data, as well as account number data and other relevant data. In step S5, the server device 20 receives the data from the content provider terminal device 10 and updates accordingly the database in the storage unit 21. More specifically, as shown in Table 2 below, the control unit 25 of the server grants a content provider ID (O, P, Q, etc.) to each content provider uploading and registering the music data. In step S6, the control unit 25 updates the database by inputting the music data name, distribution conditions and other data in correspondence with each content provider ID. Illustratively, distribution conditions attached to music data may specify that the data be distributed only to males in their 20's, to females in their 20's, or to males and females in their teens and 20's. In practice, the distribution conditions can be quite diverse.

TABLE 2

| CONTENT PROVIDER ID | MUSIC DATA NAME | DISTRIBUTION CONDITIONS | CHARGE DATA |
|---|---|---|---|
| O | aaaa | MALES IN THEIR 20'S | ¥ 20000 |
| P | bbbb | FEMALES IN THEIR 20'S | ¥ 20000 |
| Q | cccc | MALES AND FEMALES IN THEIR TEENS AND 20'S | ¥ 40000 |
| R | dddd | MALES AND FEMALES IN THEIR 20'S LIVING IN TOKYO-TO | ¥ 40000 |
| S | abcd | MALES AND FEMALES IN THEIR 20'S | ¥ 30000 |
| . | . | . | . |
| . | . | . | . |

TABLE 1

| USER ID | ADDRESS | TELEPHONE NO. | AGE | GENDER | DOWNLOAD COUNT | DISCOUNT DATA |
|---|---|---|---|---|---|---|
| A | MINATO-KU, TOKYO-TO | 123456 | 25 | MALE | 1 | ¥ 200 |
| B | SHINAGAWA-KU, TOKYO-TO | 456789 | 30 | FEMALE | 2 | ¥ 400 |
| C | ITABASHI-KU, TOKYO-TO | 789123 | 29 | FEMALE | 1 | ¥ 200 |
| D | CHIYODA-KU, TOKYO-TO | 963258 | 21 | MALE | 3 | ¥ 600 |
| E | YOKOHAMA-SHI, KANAGAWA-KEN | 741258 | 18 | MALE | 2 | ¥ 400 |
| . | . | . | . | . | . | . |
| . | . | . | . | . | . | . |

TABLE 2-continued

| CONTENT PROVIDER ID | MUSIC DATA NAME | DISTRIBUTION CONDITIONS | CHARGE DATA |
|---|---|---|---|
| . | . | . | . |

In step S7, the server device 20 searches the database for applicable users of the mobile communication terminal devices 30 based on the distribution conditions sent from the content provider terminal device 10. For example, as shown in Table 3 below, the distribution conditions given by the content provider O (shown in Table 2) may specify that the data be distributed to males in their 20's. Accordingly the control unit 25 searches the database (shown in Table 1) for those users of the mobile communication terminal devices 30 who meet the above conditions, i.e., users A, C and D in this case.

TABLE 3

DISTRIBUTION CONDITIONS: MALE IN THEIR 20'S

| USER ID | ADDRESS | TELEPHONE NO. | AGE | GENDER | DISCOUNT DATA |
|---|---|---|---|---|---|
| A | MINATO-KU, TOKYO-TO | 123456 | 25 | MALE | ¥ 200 |

TABLE 3-continued

CONTENT PROVIDER ID: O
DISTRIBUTION CONDITIONS: MALE IN THEIR 20'S

| USER ID | ADDRESS | TELEPHONE NO. | AGE | GENDER | DISCOUNT DATA |
|---|---|---|---|---|---|
| C | ITABASHI-KU, TOKYO-TO | 789123 | 29 | FEMALE | ¥ 200 |
| D | CHIYODA-KU, TOKYO-TO | 963258 | 21 | MALE | ¥ 600 |
| . | . | . | . | . | . |
| . | . | . | . | . | . |
| . | . | . | . | . | . |

In step S8, the server device 20 transmits the music data to the mobile communication terminal devices 30 of the users picked up in step S7.

In step S9, the mobile communication terminal device 30 in a standby status receives an incoming call signal from the base station 2 and starts downloading the music data from the server device 20. The mobile communication terminal device 30 receives the music data via the antenna 31. The received data are amplified by the RF unit 32 and demodulated by the demodulator 33. The music data are extracted by the channel CODEC 34 from the demodulated data and stored into the storage unit 42.

With the music data downloaded, the mobile communication terminal device 30 goes to step S10 and transmits to the server device 20 a download-complete signal telling the latter that downloading of the music data has been completed. In step S11, the download-complete signal from the mobile communication terminal device 30 is received by the server device 20. In step S12, the server device 20 transmits a distribution-complete notice to the content provider terminal device 10 of the sponsor offering the music data in question. In step S13, the content provider terminal device 10 receives the distribution-complete notice from the server device 20. The notice informs the content provider that the music data have been distributed to the mobile communication terminal devices 30 owned by the specific users who meet the predetermined conditions.

In step S14, the server device 20 generates charge data for the content providers and call fee discount data for the users of the mobile communication terminal devices 30. As indicated in Table 1, if a user is entitled to a discount of ¥200 every time he or she downloads music data from the server device 20, then users A and C get a ¥200 discount each because they have downloaded the music data once from the server device 20. In like manner, users B and E obtain a discount of ¥400 each since they have downloaded the music data twice from the server device 20; user D is entitled to a ¥600 discount, having downloaded the music data three times from the server device 20.

As shown in Table 2, if a content provider is charged ¥10,000 for one distribution condition, then content provider O is charged ¥20,000 because the provider specifies two conditions, i.e., "males" and "in their 20's"; content provider P is also charged ¥20,000 because the provider specifies two conditions, i.e., "females" and "in their 20's"; content provider Q is charged ¥40,000 because the provider specifies four conditions, i.e., "males," "females," "in their teens," and "in their 20's"; content provider R is also charged ¥40,000 because the provider specifies four conditions, i.e., "males," "females," "in their 20's," and "living in Tokyo"; content provider S is charged ¥30,000 because the provider specifies three conditions, i.e., "males," "females" and "in their 20's."

After generating the user discount data and the content provider charge data as described above, the server device 20 goes to step S15. In step S15, the server device 20 transmits the user discount data to the central management device 50 for call fee discounts and the content provider charge data to the charge server device 60 for settlement of charges.

Figure 3:
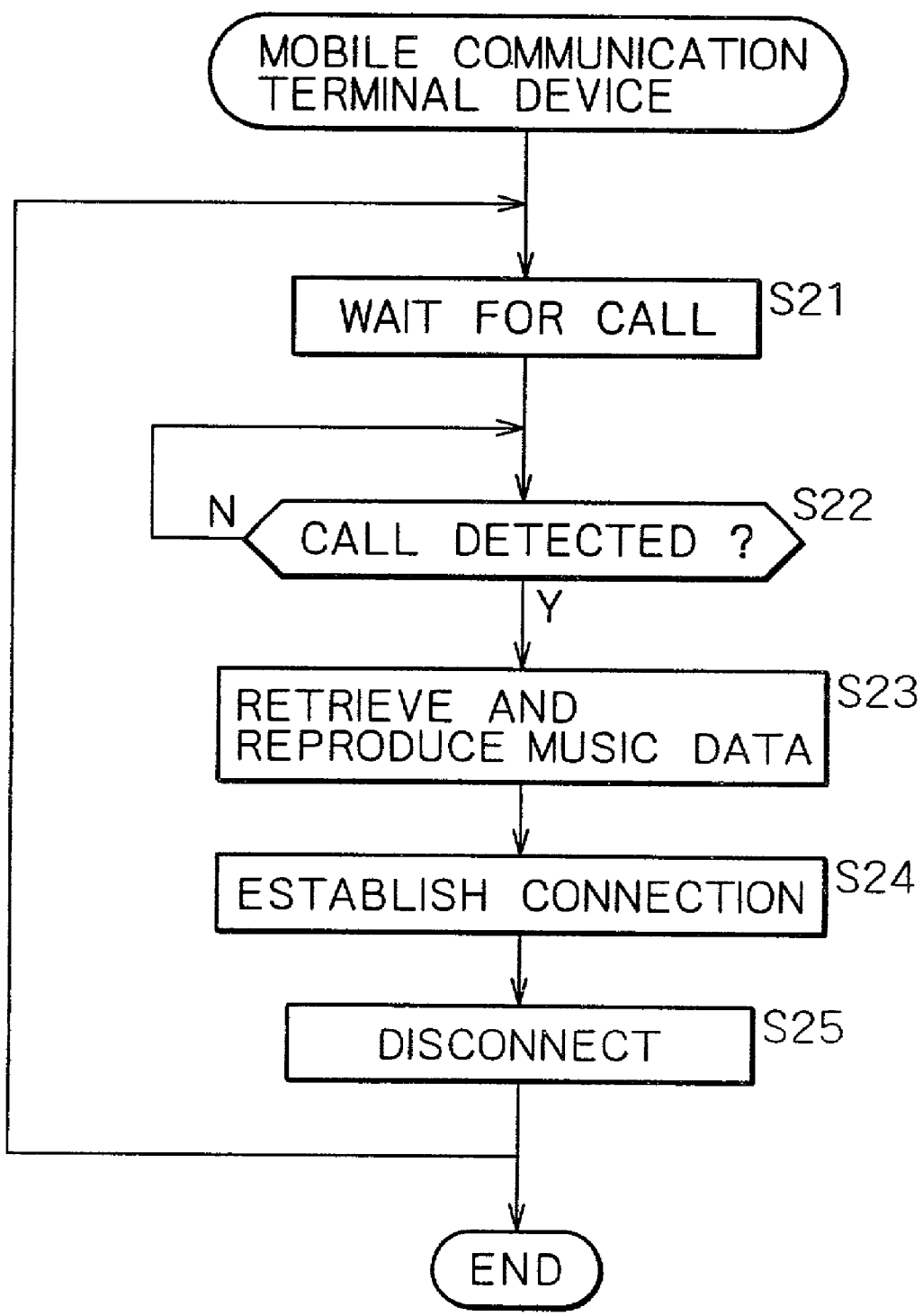
FIG. 3 is a flowchart of steps in which the mobile communication terminal device operates when employing as a ring tone the music data downloaded from the server device.

Described below with reference to FIG. 3 is how the mobile communication terminal device 30 operates when using as a ring tone the music data downloaded from the server device 20. In step S21, the control unit 45 waits for an incoming call signal from the base station 2. In step S22, the control unit 45 checks to see if any incoming call signal has been detected. If an incoming call signal is judged detected from the base station 2, the control unit 45 goes to step S23; if no incoming call signal is judged detected, the control unit 45 repeats step S22.

On receiving an incoming call signal from the base station 2, the control unit 45 goes to step S23. In step S23, the control unit 45 retrieves and reproduces as a ring tone the music data that were stored in the storage unit 42 after being downloaded from the server device 20. The music data read from the storage unit 42 are decoded by the decoder 36. The decoded data are converted from digital to analog format by the D/A converter 37 before being output from the speaker 38. The volume of the ring tone being reproduced is controlled by the control unit 45 in keeping with the volume level set on the volume control unit 48.

In step S24, the user pushes the off-hook button on the input operation unit 46, causing the control unit 45 to establish a connection with the base station 2. Call data sent from the base station 2 are received by the antenna, amplified by the RF unit 32, and demodulated by the demodulator 33. The channel CODEC 34 extracts voice data from the demodulated data. The extracted voice data are decoded by the decoder 36 and converted to analog format by the D/A converter 37 before being output from the speaker 38. The voice spoken by the user is converted to an analog signal by the microphone 39 and converted to a digital signal by the A/D converter 40. The digitized voice data are encoded by the encoder 41 and channel-coded by the channel CODEC 34. The voice data are then modulated by the modulator 35, amplified by the RF unit 32 and transmitted from the antenna 31 to the base station 2.

When the user pushes an on-hook button on the input operation unit 46, the control unit 45 severs the connection and returns to step S21. In step S21, the control unit 45 again enters a standby status waiting for an incoming call.

Once a call signal from a mobile communication terminal device 30 is detected and a connection is established, the central management device 50 starts adding up a call fee for the terminal device 30 in accordance with the call time run up by the user on the device 30. After receiving user discount data for the mobile communication terminal devices 30 from the server device 20 in step S15 of FIG. 2, the central management device 50 updates call data about individual users illustratively once a month. Specifically, the central management device 50 deducts the amount represented by the discount data from the call fee of each user to calculate charges constituting the definitive call data.

TABLE 4

| USER ID | ADDRESS | TELEPHONE NO. | CALL FEE | DISCOUNT DATA | CHARGE AMOUNT |
| --- | --- | --- | --- | --- | --- |
| A | MINATO-KU, TOKYO-TO | 123456 | ¥ 5000 | ¥ 200 | ¥ 4800 |
| B | SHINAGAWA-KU, TOKYO-TO | 456789 | ¥ 6000 | ¥ 400 | ¥ 5600 |
| C | ITABASHI-KU, TOKYO-TO | 789123 | ¥ 4000 | ¥ 200 | ¥ 3800 |
| D | CHIYODA-KU, TOKYO-TO | 963258 | ¥ 3000 | ¥ 600 | ¥ 2400 |
| E | YOKOHAMA-SHI, KANAGAWA-KEN | 741258 | ¥ 7000 | ¥ 400 | ¥ 6600 |
| . | . | . | . | . | . |
| . | . | . | . | . | . |
| . | . | . | . | . | . |

In the example of Table 4 above, user A is initially charged ¥5,000 for calls but entitled to a discount of ¥200, which means the user A is ultimately charged ¥4,800. Likewise, user B is eventually charged ¥5,600 with a discount of ¥400 made on the initial call fee of ¥6,000; user C is charged ¥3,800 with a discount of ¥200 on the initial call fee of ¥4,000; user D is charged ¥2,400 with a discount of ¥600 on the initial call fee of ¥3,000; user E is charged ¥6,600 with a discount of ¥400 on the initial call fee of ¥7,000. The central management device 50 transmits the data above to the charge server device 60.

Figure 4:
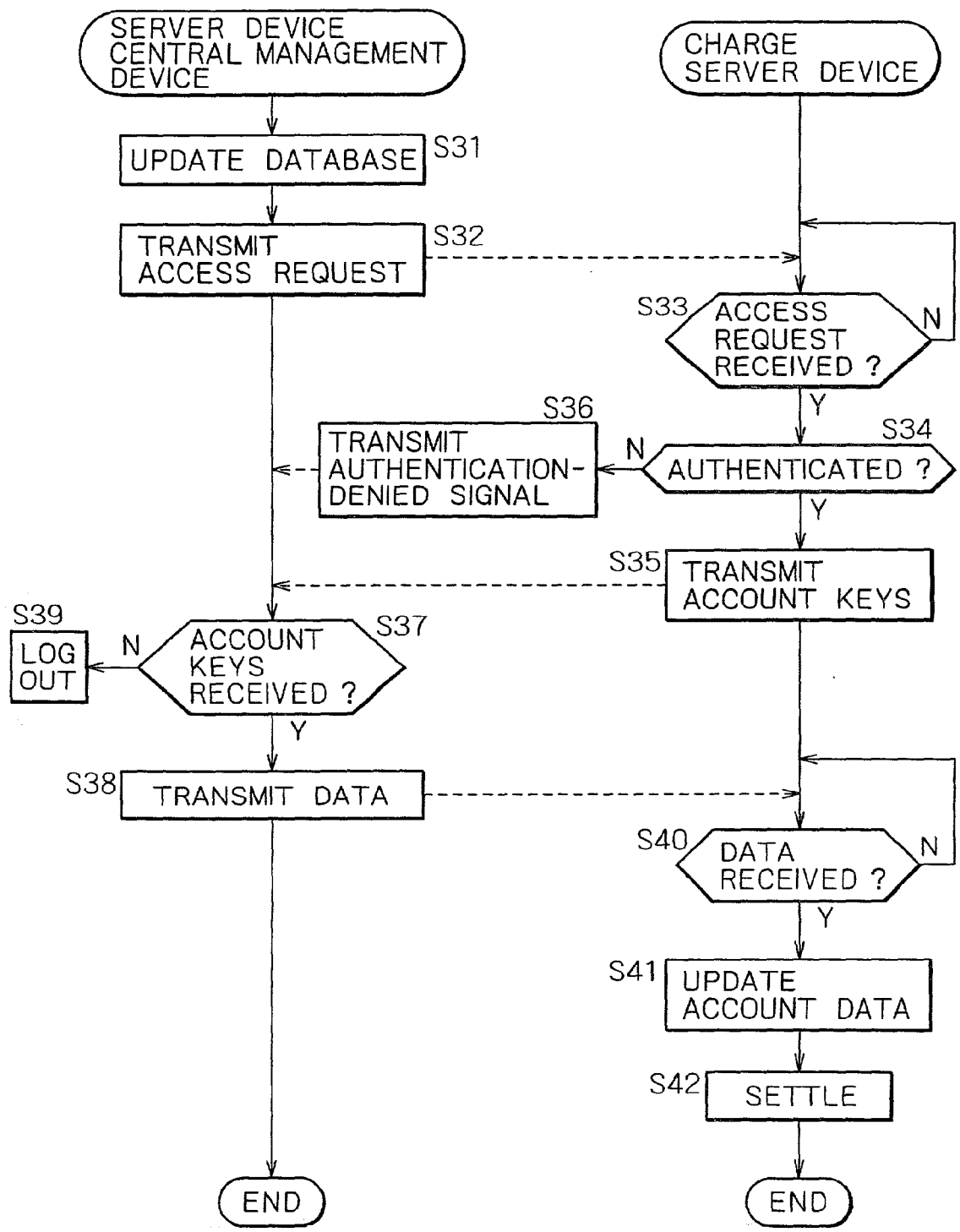
FIG. 4 is a flowchart of steps for settling account balances.

Described below with reference to FIG. 4 is how accounts are settled by the data transmission-reception system 1 described above. In step S31 of FIG. 4, the server device 20 and the central management device 50 update their databases. That is, the server device 20 generates once a month charge data for the content providers who uploaded music data for advertising purposes; the central management device 50 monthly generates call data, i.e., definitive charge data for the users of the mobile communication terminal devices 30 by deducting from the users' call fees their discount data transmitted from the server device 20 as shown in Table 4 above.

In step S32, the server device 20 transmits to the charge server device 60 an access request together with a server ID over the leased line 4. The central management device 50 likewise transmits to the charge server device 60 an access request along with a device ID of the management device 50 over the leased line 5.

The charge server device 60 on standby waiting for an access request to arrive checks to see in step S33 whether any access request has been received. If an access request is judged received, step S34 is reached; if no access request is judged received, step S33 is repeated. In step S34, the charge server device 60 performs an authentication process on the server ID sent from the server device 20 as well as on the server ID from the central management device 50. When the IDs are authenticated, the charge server device 60 goes to step S35. If authentication is denied, step S36 is reached.

It is assumed that the users of the mobile communication terminal devices 30 and the content providers have declared their bank accounts before applying for this service and that the charge server device 60 retains user account keys and content provider account keys in correspondence with the accounts. When the server IDs are authenticated in step S34, the charge server device 60 goes to step S35 and transmits a content provider account key to the server device 20 and a user account key to the central management device 50.

If the server IDs are not authenticated in step S34, the charge server device 60 transmits an authentication-denied signal to the server device 20, telling the administrator of the server device 20 (i.e., administrator of this system) that authentication has been denied. Likewise the charge server device 60 transmits an authentication-denied signal to the central management device 50 telling the latter's administrator the failure to acquire authentication of this system.

In step S37, the server device 20 and the central management device 50 determine whether the account keys have been received. If the account keys are judged received, step S38 is reached; if no account keys are judged received, then step S39 is reached and the process is brought to an end.

In step S38, the server device 20 transmits to the charge server device 60 the content provider account keys along with the charge data for the content providers as shown in Table 2; the central management device 50 transmits to the charge server device 60 the user account keys together with the definitive call fee data after user discounts as shown in Table 4.

In step S40, the charge server device 60 on standby checks to see if any data have been received. If the data are judged received from the server device 20 or from the central management device 50, the charge server device 60 goes to step S41; if no data are judged received, then step S40 is repeated. In step S41, the charge server device 60 updates its database, i.e., records of dates, payment and deposit transactions and account balances, on the basis of the data from the server device 20 or from the central management device 50.

That is, the charge server device 60 updates the content provider account data based on the charge data from the server device 20, and transfers the relevant amounts to the account of the administrator of the server device 20. The charge server device 60 also updates the user account data in keeping with the discount call data from the central management device 50 and transfers the relevant amounts to the account of the administrator of the central management device 50.

As described, the inventive data transmission-reception system 1 above allows the mobile communication terminal devices 30 to reproduce as their ring tones the music data provided by content providers for advertisement. That is, the system 1 boosts the effort of the content providers effectively to advertise their music data that are played back by numerous users as ring tones at diverse locations in the city. When the music data are distributed from the server device 20 according to predetermined distribution conditions specified by content providers, the music data are advertised in a more effectively targeted manner than ever. The users of the mobile communication terminal devices 30 enjoy call fee discounts for their contribution to the content providers' advertising campaign The call fee discounts offered by this system will attract a growing number of users who in turn will enliven the business activities of the parties involved.

Figure 5:
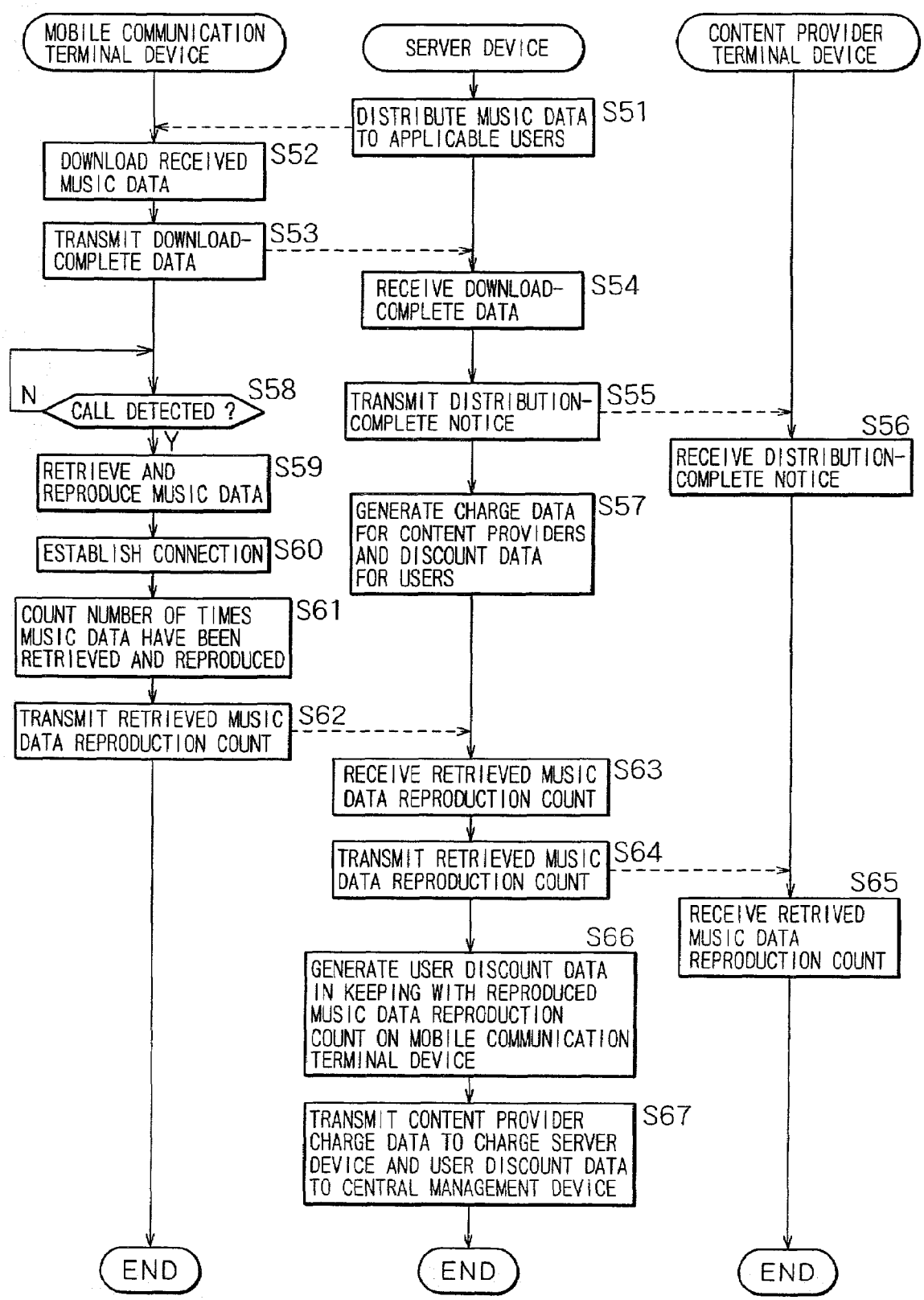
FIG. 5 is a flowchart of steps for counting the number of times a user's mobile communication terminal device has reproduced music data downloaded from the server device as a ring tone so that call charges for the terminal device are reduced in keeping with the data reproduction count.

A variation of the data transmission-reception system 1 according to the invention will now be described with reference to FIG. 5. This system involves counting the number of times the music data downloaded from the server device 20 for use as a ring tone by each user's mobile communication terminal device 30 have been reproduced, and making a call fee discount for the terminal device 30 in accordance with the number of times the music data have been reproduced thereby. The system has been conceived on the assumption that the prospective advertising effect is greater the larger the number of times the music data have been reproduced—and the larger the number of people who have overheard the reproduced music. This system is the same in constitution as that of FIG. 1 and thus structural details of the system will not be discussed further.

The server device 20 and mobile communication terminal devices 30 first carry out steps S1 through S7 in FIG. 2. In step S51 of FIG. 5, the server device 20 distributes music data to the mobile communication terminal devices 30 of those users who were picked up in step S7 for compliance with the distribution conditions sent earlier from the content provider terminal device 10. In step S52, the mobile communication terminal device 30 on standby receives a call signal from the base station 2 and starts downloading the music data transmitted from the server device 20. The mobile communication terminal device 30 receives the music data via the antenna 31. The received data are amplified by the RF unit 32 and demodulated by the demodulator 33. The music data are extracted by the channel CODEC 34 from the demodulated data and stored into the storage unit 42.

With the music data downloaded, the mobile communication terminal device 30 goes to step S53 and transmits to the server device 20 a download-complete signal telling the latter that downloading of the music data has been completed. In step S54, the download-complete signal from the mobile communication terminal device 30 is received by the server device 20. In step S55, the server device 20 transmits a distribution-complete notice to the content provider terminal device 10 of the sponsor offering the music data in question. In step S56, the content provider terminal device 10 receives the distribution-complete notice from the server device 20. The notice informs the content provider that the music data have been distributed to the mobile communication terminal devices 30 owned by the specific users who meet the predetermined distribution conditions.

In step S57, the server device 20 generates charge data for the content providers and call fee discount data for the users of the mobile communication terminal devices 30 as indicated in Tables 1 and 2 above.

After downloading the music data from the server device 20 and now on standby, the mobile communication terminal device 30 reaches step S58. In step S58, the mobile communication terminal device 30 checks to see if any incoming call signal has been received from the base station 2. If an incoming call signal is judged detected from the base station 2, step S59 is reached; if no incoming call signal is judged detected, then step S58 is repeated.

On receiving an incoming call signal from the base station 2, the mobile communication terminal device 30 goes to step S59. In step S59, the terminal device 30 retrieves and reproduces as a ring tone the music data that have been stored in the storage unit 42 after being downloaded from the server device 20. The music data read from the storage unit 42 are decoded by the decoder 36. The decoded data are converted from digital to analog format by the D/A converter 37 before being output from the speaker 38.

In step S60, the user pushes the off-hook button on the input operation unit 46, causing the mobile communication terminal device 30 to establish a connection with the base station 2. Call data sent from the base station 2 are received by the antenna, amplified by the RF unit 32, and demodulated by the demodulator 33. The channel CODEC 34 extracts voice data from the demodulated data. The extracted voice data are decoded by the decoder 36 and converted to analog format by the D/A converter 37 before being output from the speaker 38. The voice spoken by the user is converted to an analog signal by the microphone 39 and converted to a digital signal by the A/D converter 40. The digitized voice data are encoded by the encoder 41 and channel-coded by the channel CODEC 34. The voice data are then modulated by the modulator 35, amplified by the RF unit 32 and transmitted from the antenna 31 to the base station 2. When the user pushes the on-hook button on the input operation unit 46, the mobile communication terminal device 30 severs the connection.

In step S61, the control unit 45 of the mobile communication terminal device 30 counts the number of times the music data downloaded from the server device 20 and retrieved from the storage unit 42 have been reproduced as the ring tone. In step S62, the mobile communication terminal device 30 transmits to the server device 20 the reproduction count of the music data during a predetermined period of time (e.g., one month).

In step s63, the server device 20 receives the music data reproduction count from the mobile communication terminal device 30. At this point, the server device 20 receives the music data reproduction counts from all mobile communication terminal devices 30 to which the music data in question have been distributed, and totals the counts from every terminal device 30 preparatory to informing the content providers of the total music data reproduction counts. In step S64, the total number of times the music data have been reproduced by each user is transmitted to the content provider terminal device 10. In step S65, each content provider terminal device 10 receives the total reproduction counts by the users of the music data it has offered. This informs the people concerned at the agencies, record companies or other establishments involved how their music data have been advertised, given the reported number of times the data have been reproduced as ring tones by the mobile communication terminal devices 30.

In step S66, the server device 20 generates discount data regarding each user's music data reproduction count on the mobile communication terminal device 30, and adds the data thus generated to the discount data reflecting the user's download count in order to compute total discount data for each user.

TABLE 5

| USER ID | DOWNLOAD COUNT | DISCOUNT DATA BASED ON DOWNLOAD COUNT | REPRODUCTION COUNT | DISCOUNT DATA BASED ON REPRODUCTION COUNT | TOTAL DISCOUNT DATA |
|---|---|---|---|---|---|
| A | 1 | ¥ 200 | 10 | ¥ 100 | ¥ 300 |
| B | 2 | ¥ 400 | 20 | ¥ 200 | ¥ 600 |
| C | 1 | ¥ 200 | 30 | ¥ 300 | ¥ 500 |
| D | 3 | ¥ 600 | 40 | ¥ 400 | ¥ 1000 |
| E | 2 | ¥ 400 | 50 | ¥ 500 | ¥ 900 |
| . | . | . | . | . | . |
| . | . | . | . | . | . |
| . | . | . | . | . | . |

Illustratively, as shown in Table 5, each user may receive a discount of ¥200 every time the user downloads music data once from the server device 20. An additional discount reflecting the reproduction count may be zero when the music data have been reproduced as a ring tone up to nine times. The discount may be ¥100 for a music data reproduction count of 10 to 19; ¥200 for a reproduction count of 20 to 29, ¥300 for a count of 30 to 39; ¥400 for a count of 40 to 49; and ¥500 for a count of 50 to 59.

In Table 5 above, user A is shown having downloaded the music data once for a discount of ¥200 and reproduced the data 10 times for a discount of ¥100, which amounts to a total discount of ¥300. User B is given a total discount of ¥600, having downloaded the music data twice for a discount of ¥400 and reproduced the data 20 times for a discount of ¥200; user C receives a total discount of ¥500 having downloaded the music data once for a discount of ¥200 and reproduced the data 30 times for a discount of ¥300; user D is entitled to a total discount of ¥1,000 having downloaded the music data three times for a discount of ¥600 and reproduced the data 40 times for a discount of ¥400; user E gains a total discount of ¥900 having downloaded the music data twice for a discount of ¥400 and reproduced the data 50 times for a discount of ¥500.

The server device 20 generates charge data for the content providers in the same manner as shown in Table 2 above.

After generating the users' total discount data and the content providers' charge data as described above, the server device 20 goes to step S67. In step S67, the charge server 20 transmits the user discount data to the central management device 50 for call fee discounts and the content provider charge data to the charge server device 60 for settlement of charges.

After detecting a call signal from any mobile communication terminal device 30 and establishing a connection therewith, the central management device 50 adds up a call fee in accordance with a call time that elapses on the terminal device 30 in question. In step S67, the central management device 50, having received from the server device 20 the users' total discount data on their mobile communication terminal devices 30, updates the users' call data illustratively once a month. More specifically, the central management device 50 deducts the total discount data from each user's call fees in order to compute call data constituting the users' definitive call fees.

TABLE 6

| USER ID | ADDRESS | TELEPHONE NO. | CALL FEE | TOTAL DISCOUNT DATA | CHARGE AMOUNT |
|---|---|---|---|---|---|
| A | MINATO-KU, TOKYO-TO | 123456 | ¥ 5000 | ¥ 300 | ¥ 4700 |
| B | SHINAGAWA-KU, TOKYO-TO | 456789 | ¥ 6000 | ¥ 600 | ¥ 5400 |
| C | ITABASHI-KU, TOKYO-TO | 789123 | ¥ 4000 | ¥ 500 | ¥ 3500 |
| D | CHIYODA-KO, TOKYO-TO | 963258 | ¥ 3000 | ¥ 1000 | ¥ 2000 |
| E | YOKOHAMA-SHI, KANAGAWA-KEN | 741258 | ¥ 7000 | ¥ 900 | ¥ 6100 |
| . | . | . | . | . | . |
| . | . | . | . | . | . |
| . | . | . | . | . | . |

In the example of Table 6 above, user A is charged ¥4,700 with a discount of ¥300 made on a call fee of ¥5,000; user B is charged ¥5,400 with a discount of ¥600 on a call fee of ¥6,000; user C is charged ¥3,500 with a discount of ¥500 on a call fee of ¥4,000; user D is charged ¥2,000 with a discount of ¥1,000 on a call fee of ¥3,000; user E is charged ¥6,100 with a discount of ¥900 on a call fee of ¥7,000. The central management device 50 transmits the data above to the charge server device 60.

Following the steps in the flowchart of FIG. 4, the server device 20 transmits the content provider charge data to the charge server device 60 while the central management device 50 transmits the user charge data to the charge server device 60. In response, the charge server device 60 updates its database, i.e., records of dates, payment and deposit transactions and account balances, on the basis of the data from the server device 20 or from the central management device 50. That is, the charge server device 60 updates the content provider account data based on the charge data from the server device 20, and transfers the relevant amounts to the account of the administrator of the server device 20. The charge server device 60 also updates the user account data in keeping with the discount call data from the central management device 50 and transfers the relevant amounts to the account of the administrator of the central management device 50.

The above-described data transmission-reception system allows the users of the mobile communication terminal devices 30 to get further discounts on their call fees depending on the number of times they have reproduced music data as ring tones. The additional discounts serve as a further incentive to promote widespread acceptance of this system. Meanwhile, in the earlier description of step S61 in FIG. 5, the control unit 45 of the mobile communication terminal device 30 was shown counting the number of times the music data had been retrieved and reproduced following the disconnection. However, this is not limitative of the invention. Alternatively, immediately after the music data in the storage unit 42 start being reproduced in step S59 under control of the control unit 45, the control unit 45 may count the number of times the music data have been retrieved and reproduced.

Figure 6:
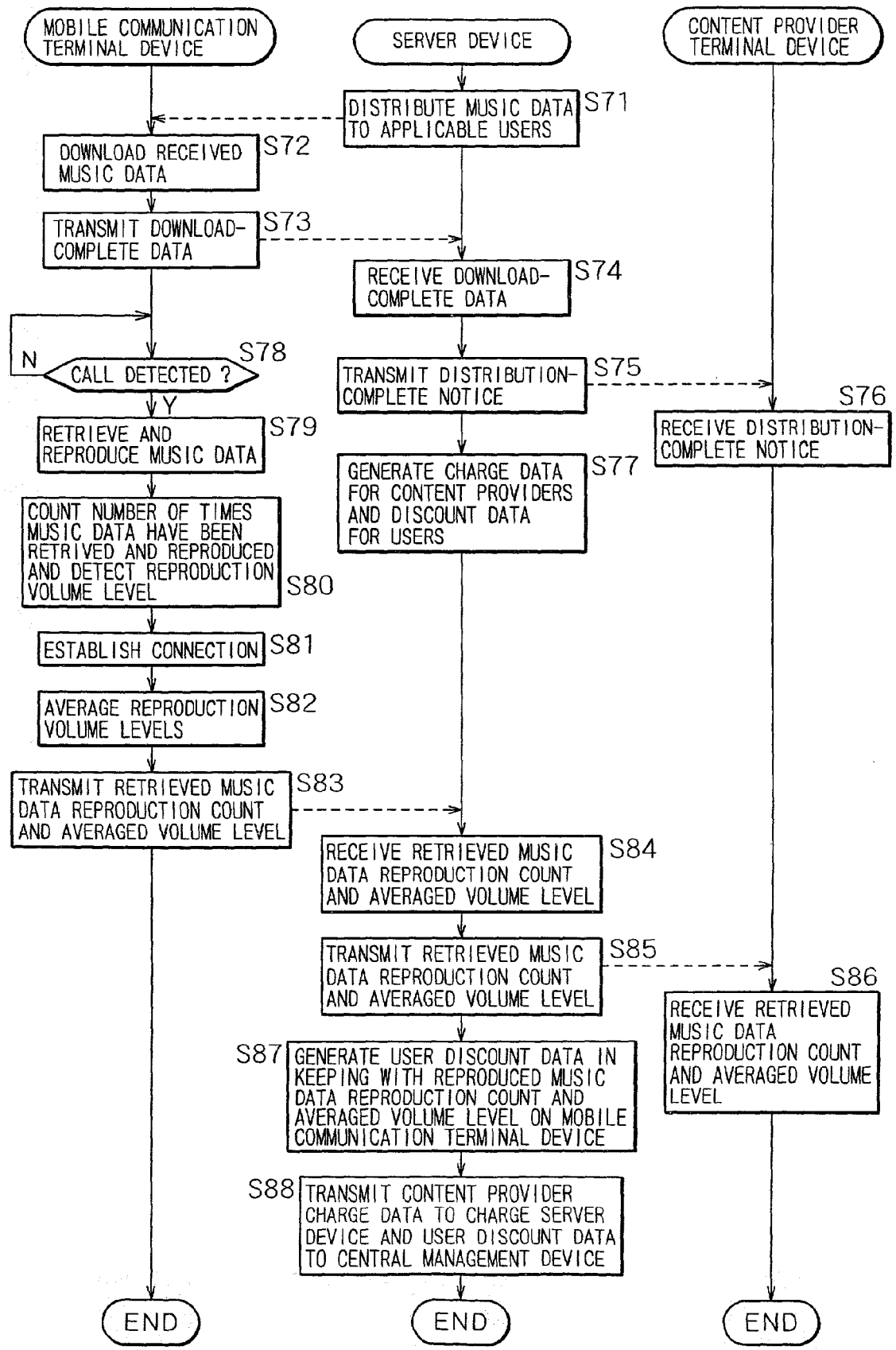
FIG. 6 is a flowchart of steps for making a larger discount on call charges for the mobile communication terminal device the higher the volume of music data being reproduced as a ring tone after being downloaded from the server device.

Another variation of the data transmission-reception system 1 according to the invention will now be described with reference to FIG. 6. This system involves making larger discounts on call fees of the mobile communication terminal device 30 the higher the volume of music data being reproduced as a ring tone after being downloaded from the server device 20. The system has been conceived on the assumption that the prospective advertising effect is greater the higher the volume of the music data being reproduced as a ring tone; the higher the music data reproduction volume, the larger the number of people who overhear the reproduced music. This system is the same in constitution as that of FIG. 1 and thus structural details of the system will not be discussed further.

The server device 20 and mobile communication terminal devices 30 first carry out steps S1 through S7 in FIG. 2. In step S71 of FIG. 6, the server device 20 distributes music data to the mobile communication terminal devices 30 of those users who were picked up in step S7 for compliance with the distribution conditions sent earlier from the content provider terminal device 10. In step S72, the mobile communication terminal device 30 on standby receives a call signal from the base station 2 and starts downloading the music data transmitted from the server device 20. The mobile communication terminal device 30 receives the music data via the antenna 31. The received data are amplified by the RF unit 32 and demodulated by the demodulator 33. The music data are extracted by the channel CODEC 34 from the demodulated data and stored into the storage unit 42.

With the music data downloaded, the mobile communication terminal device 30 goes to step S73 and transmits to the server device 20 a download-complete signal telling the latter that downloading of the music data has been completed. In step S74, the download-complete signal from the mobile communication terminal device 30 is received by the server device 20. In step S75, the server device 20 transmits a distribution-complete notice to the content provider terminal device 10 of the sponsor offering the music data in question. In step S76, the content provider terminal device 10 receives the distribution-complete notice from the server device 20. The notice informs the content provider that the music data have been distributed to the mobile communication terminal devices 30 owned by the specific users who meet the predetermined distribution conditions.

In step S77, the server device 20 generates charge data for the content providers and call fee discount data for the users of the mobile communication terminal devices 30 as indicated in Tables 1 and 2 above.

After downloading the music data from the server device 20 and now on standby, the mobile communication terminal device 30 reaches step S78. In step S78, the mobile communication terminal device 30 checks to see if any incoming call signal has been received from the base station 2. If an incoming call signal is judged detected from the base station 2, step S79 is reached; if no incoming call signal is judged detected, then step S78 is repeated.

On receiving an incoming call signal from the base station 2, the mobile communication terminal device 30 goes to step S79. In step S79, the terminal device 30 retrieves and reproduces as a ring tone the music data that have been stored in the storage unit 42 after being downloaded from the server device 20. The music data read from the storage unit 42 are decoded by the decoder 36. The decoded data are converted from digital to analog format by the D/A converter 37 before being output from the speaker 38. At this point, the volume of the ring tone is controlled by the control unit 45 in accordance with the volume level set on the volume control unit 48. The volume level may be adjusted in steps, illustratively from level 0 (sound muted) to level 4 (maximum volume), by operating the volume control unit 48.

In step S80, the control unit 45 of the mobile communication terminal device 30 counts the number of times the music data have been retrieved and reproduced from the storage unit 42 after being downloaded from the server device 20. The control unit 45 further detects the volume at which the music data are being reproduced as the ring tone.

In step S81, the user pushes the off-hook button on the input operation unit 46, causing the mobile communication terminal device 30 to establish a connection with the base station 2. Call data sent from the base station 2 are received by the antenna, amplified by the RF unit 32, and demodulated by the demodulator 33. The channel CODEC 34 extracts voice data from the demodulated data. The extracted voice data are decoded by the decoder 36 and converted to analog format by the D/A converter 37 before being output from the speaker 38. The voice spoken by the user is converted to an analog signal by the microphone 39 and converted to a digital signal by the A/D converter 40. The digitized voice data are encoded by the encoder 41 and channel-coded by the channel CODEC 34. The voice data are then modulated by the modulator 35, amplified by the RF unit 32 and transmitted from the antenna 31 to the base station 2. When the user pushes the on-hook button on the input operation unit 46, the mobile communication terminal device 30 severs the connection.

In step S82, the mobile communication terminal device 30 averages the volume levels of the music data reproduced as the ring tone over a predetermined period of time (e.g., one month). In step S83, the mobile communication terminal device 30 transmits to the server device 20 the number of times the music data have been reproduced illustratively over the predetermined period of one month, as well as the averaged volume level of the music data reproduced during the same period.

In step S84, the server device 20 receives from the mobile communication terminal device 30 the number of times the music data have been reproduced as well as the averaged volume level of the music data reproduced over the predetermined period. That is, the server device 20 receives the music data reproduction counts and averaged reproduction volume levels from all mobile communication terminal devices 30 to which the music data were distributed. In step S85, server device 20 transmits the above data to the content provider terminal device 10 notifying the content provider of the total reproduction count and averaged reproduction volume level of the music data in question. In step S86, the content provider terminal device 10 receives the data from the server device 20. The received data inform the people concerned at the agencies, record companies or other establishments involved how their music data have been advertised, given the reported number of times the music data have been reproduced as ring tones and the levels of the music reproduced by the mobile communication terminal devices 30.

In step S87, the server device 20 generates discount data regarding each user's music data reproduction count and reproduction volume level on the mobile communication terminal device 30, and adds the data thus generated to the discount data reflecting the user's download count in order to compute total discount data for each user.

TABLE 7

| USER ID | DOWN- LOAD COUNT | DISCOUNT DATA BASED ON DOWNLOAD COUNT | REPRO- DUCTION COUNT | DISCOUNT DATA BASED ON REPRODUCTION COUNT |
|---|---|---|---|---|
| A | 1 | ¥ 200 | 10 | ¥ 100 |
| B | 2 | ¥ 400 | 20 | ¥ 200 |
| C | 1 | ¥ 200 | 30 | ¥ 300 |
| D | 3 | ¥ 600 | 40 | ¥ 400 |
| E | 2 | ¥ 400 | 50 | ¥ 500 |
| . | . | . | . | |
| . | . | . | . | |
| . | . | . | . | |

| AVERAGED REPRODUCTION VOLUME LEVEL | DISCOUNT DATA BASED ON REPRODUCTION VOLUME LEVEL | TOTAL DISCOUNT DATA |
|---|---|---|
| LEVEL 3 | ¥ 30 | ¥ 330 |
| LEVEL 4 | ¥ 40 | ¥ 640 |
| LEVEL 2 | ¥ 20 | ¥ 520 |
| LEVEL 2 | ¥ 20 | ¥ 1020 |
| LEVEL 2 | ¥ 20 | ¥ 920 |
| . | . | . |
| . | . | . |
| . | . | . |

Illustratively, as shown in Table 7, each user may receive a discount of ¥200 every time the user downloads music data once from the server device 20. An additional discount reflecting the reproduction count may be zero when the music data have been reproduced as a ring tone up to nine times. The discount may be ¥100 for a music data repro- duction count of 10 to 19; ¥200 for a reproduction count of 20 to 29, ¥300 for a count of 30 to 39; ¥400 for a count of 40 to 49; and ¥500 for a count of 50 to 59. A further discount reflecting the averaged reproduction volume level may be zero at level 0; ¥10 at level 1; ¥20 at level 2; ¥30 at level 3; and ¥40 at level 4.

User A in Table 7 above is shown having downloaded the music data once for a discount of ¥200 and reproduced the data 10 times for a discount of ¥100 at a volume level of 3 for a discount of ¥30, which amounts to a total discount of ¥330. User B is given a total discount of ¥640, having downloaded the music data twice for a discount of ¥400 and reproduced the data 20 times for a discount of ¥200 at a volume level of 4 for a discount of ¥40; user C receives a total discount of ¥520 having downloaded the music data once for a discount of ¥200 and reproduced the data 30 times for a discount of ¥300 at a volume level of 2 for a discount of ¥20; user D is entitled to a total discount of ¥1,020 having downloaded the music data three times for a discount of ¥600 and reproduced the data 40 times for a discount of ¥400 at a volume level of 2 for discount of ¥20; user E gains a total discount of ¥920 having downloaded the music data twice for a discount of ¥400 and reproduced the data 50 times for a discount of ¥500 at a volume level of 2 for a discount of ¥20.

The server device 20 generates charge data for the content providers in the same manner as shown in Table 2 above.

After generating the users' total discount data and the content providers' charge data as described above, the server device 20 goes to step S88. In step S88, the charge server 20 transmits the user discount data to the central management device 50 for call fee discounts and the content provider charge data to the charge server device 60 for settlement of charges.

After detecting a call signal from any mobile communication terminal device 30 and establishing a connection therewith, the central management device 50 adds up a call fee in accordance with a call time that elapses on the terminal device 30 in question. In step S87 of FIG. 6 above, the central management device 50, having received from the server device 20 the users' total discount data on their mobile communication terminal devices 30, updates the users' call data illustratively once a month. More specifically, the central management device 50 deducts the total discount data from each user's call fees in order to compute call data constituting the users' definitive call fees.

TABLE 8

| USER ID | ADDRESS | TELEPHONE NO. | CALL FEE | TOTAL DISCOUNT DATA | CHARGE AMOUNT |
|---|---|---|---|---|---|
| A | MINATO-KU, TOKYO-TO | 123456 | ¥ 5000 | ¥ 330 | ¥ 4670 |
| B | SHINAGAWA-KU, TOKYO-TO | 456789 | ¥ 6000 | ¥ 640 | ¥ 5360 |
| C | ITABASHI-KU, TOKYO-TO | 789123 | ¥ 4000 | ¥ 520 | ¥ 3480 |
| D | CHIYODA-KU, TOKYO-TO | 963258 | ¥ 3000 | ¥ 1020 | ¥ 1980 |
| E | YOKOHAMA-SHI, KANAGAWA-KEN | 741258 | ¥ 7000 | ¥ 920 | ¥ 6080 |
| . | . | . | . | . | . |
| . | . | . | . | . | . |
| . | . | . | . | . | . |

In the example of Table 8 above, user A is charged ¥4,670 with a discount of ¥330 made on a call fee of ¥5,000; user B is charged ¥5,360 with a discount of ¥640 on a call fee of ¥6,000; user C is charged ¥3,480 with a discount of ¥520 on a call fee of ¥4,000; user D is charged ¥1,980 with a discount of ¥1,020 on a call fee of ¥3,000; user E is charged ¥6,080 with a discount of ¥920 on a call fee of ¥7,000. The central management device 50 transmits the data above to the charge server device 60.

Following the steps in the flowchart of FIG. 4, the server device 20 transmits the content provider charge data to the charge server device 60 while the central management device 50 transmits the user charge data to the charge server device 60. In response, the charge server device 60 updates its database, i.e., records of dates, payment and deposit transactions and account balances, on the basis of the data from the server device 20 or from the central management device 50. That is, the charge server device 60 updates the content provider account data based on the charge data from the server device 20, and transfers the relevant amounts to the account of the administrator of the server device 20. The charge server device 60 also updates the user account data in keeping with the discount call data from the central management device 50 and transfers the relevant amounts to the account of the administrator of the central management device 50.

The above-described data transmission-reception system allows the users of the mobile communication terminal devices 30 to get further discounts on their call fees depending on the number of times they have reproduced music data as ring tones and on the volume levels at which the music data have been reproduced. The additional discounts serve as a further incentive to promote widespread acceptance of this system. Meanwhile, in the earlier description of step S82 in FIG. 6, the control unit 45 of the mobile communication terminal device 30 was shown averaging the volume levels of music data reproduction following a predetermined period of time. However, this is not limitative of the invention. Alternatively, immediately after the control unit 45 counts the number of times the music data have been reproduced and detects the volume level of music data reproduction in step S80, the control unit 45 may transmit the music data reproduction count (once) and the reproduction volume level to the server device 20. In this case, the server device 20 adds up the music data reproduction count and reproduction volume level every time the music data have been reproduced and the reproduction count has been received (i.e., 1 per transmission). The server device 20 then totals the received reproduction counts and volume levels at predetermined intervals in order to compute the user discount data.

Figure 7:
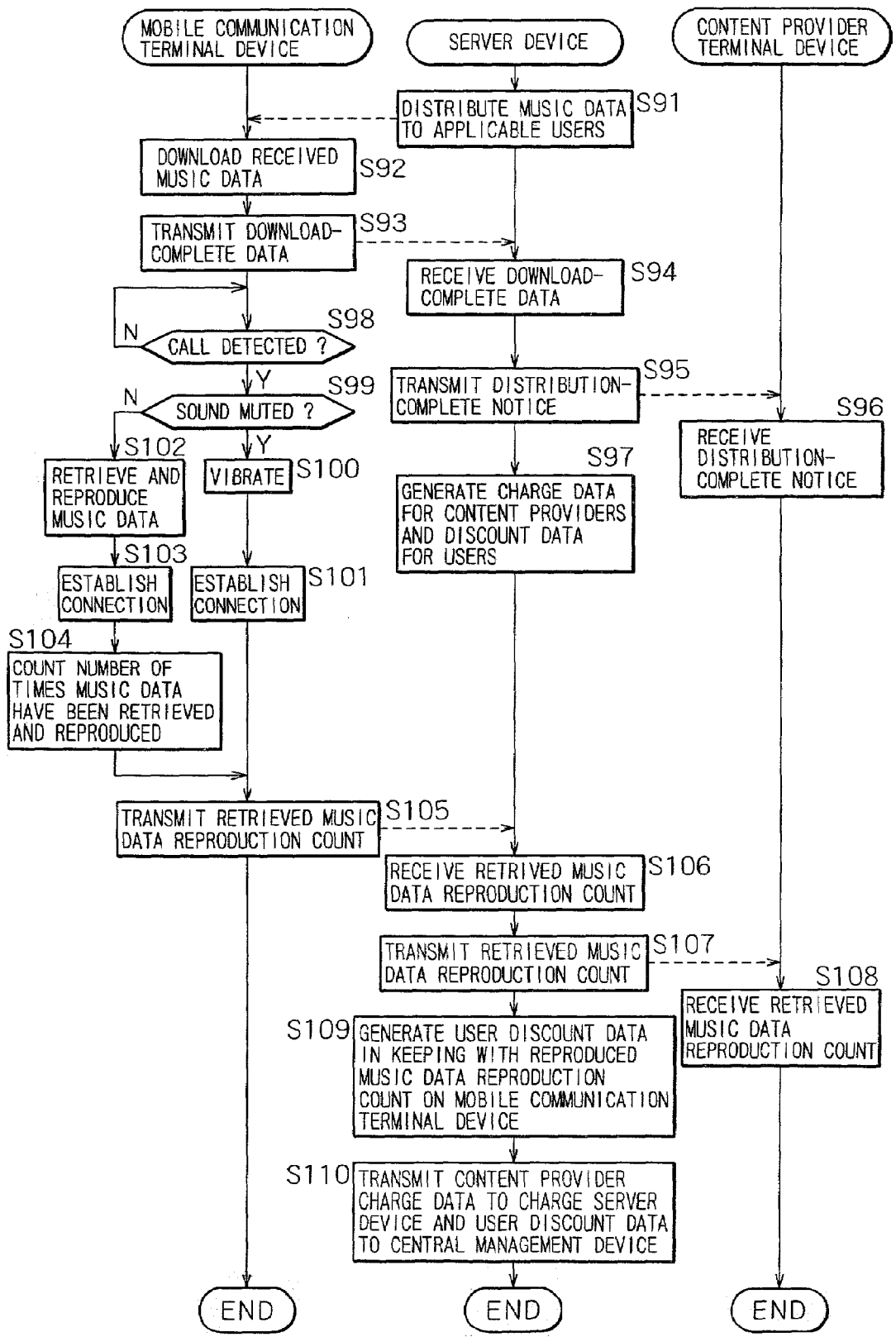
FIG. 7 is a flowchart of steps for withholding a discount on call charges for the mobile communication terminal device if the music data downloaded from the server have not been used as a ring tone.

A further variation of the data transmission-reception system 1 according to the invention will now be described with reference to FIG. 7. This system involves withholding discounts on call fees if the user of the mobile communication terminal device 30 did not use music data as a ring tone after downloading them from the server device 20. Users may at times choose to mute the ring tone of their terminal devices 30 for fear of disturbing people nearby, which obviously negates the advertising effect of the downloaded data and calls for withholding discounts correspondingly. This system is the same in constitution as that of FIG. 1 and thus structural details of the system will not be discussed further.

The server device 20 and mobile communication terminal devices 30 first carry out steps S1 through S7 in FIG. 2. In step S91 of FIG. 7, the server device 20 distributes music data to the mobile communication terminal devices 30 of those users who were picked up in step S7 for compliance with the distribution conditions sent earlier from the content provider terminal device 10. In step S92, the mobile communication terminal device 30 on standby receives a call signal from the base station 2 and starts downloading the music data transmitted from the server device 20. The mobile communication terminal device 30 receives the music data via the antenna 31. The received data are amplified by the RF unit 32 and demodulated by the demodulator 33. The music data are extracted by the channel CODEC 34 from the demodulated data and stored into the storage unit 42.

With the music data downloaded, the mobile communication terminal device 30 goes to step S93 and transmits to the server device 20 a download-complete signal telling the latter that downloading of the music data has been completed. In step S94, the download-complete signal from the mobile communication terminal device 30 is received by the server device 20. In step S95, the server device 20 transmits a distribution-complete notice to the content provider terminal device 10 of the sponsor offering the music data in question. In step S96, the content provider terminal device 10 receives the distribution-complete notice from the server device 20. The notice informs the content provider that the music data have been distributed to the mobile communication terminal devices 30 owned by the specific users who meet the predetermined distribution conditions.

In step s97, the server device 20 generates charge data for the content providers and call fee discount data for the users of the mobile communication terminal devices 30 as indicated in Tables 1 and 2 above.

After downloading the music data from the server device 20 and now on standby, the mobile communication terminal device 30 reaches step S98. In step S98, the mobile communication terminal device 30 checks to see if any incoming call signal has been received from the base station 2. If an incoming call signal is judged detected from the base station 2, step S99 is reached; if no incoming call signal is judged detected, then step S98 is repeated.

On receiving an incoming call signal from the base station 2 in step S98, the mobile communication terminal device 30 checks to see in step S99 whether mute mode is currently in effect to suppress the ring tone for alerting the user to the incoming call. If mute mode is judged selected, the mobile communication terminal device 30 goes to step S100; if mute mode is not judged in effect, then step S102 is reached.

In step S100, the mobile communication terminal device 30 activates illustratively a vibrating mechanism inside the enclosure of the device 30 to alert the user to the incoming call by the throbbing motion. The vibrating mechanism will not be described here in detail. Alternatively the terminal device 30 may flash the display unit 47 to signal the incoming call to the user. In step S101, the user pushes the off-hook button on the input operation unit 46, causing the mobile communication terminal device 30 to establish a connection with the base station 2. Call data sent from the base station 2 are received by the antenna, amplified by the RF unit 32, and demodulated by the demodulator 33. The channel CODEC 34 extracts voice data from the demodulated data. The extracted voice data are decoded by the decoder 36 and converted to analog format by the D/A converter 37 before being output from the speaker 38. The voice spoken by the user is converted to an analog signal by the microphone 39 and converted to a digital signal by the A/D converter 40. The digitized voice data are encoded by the encoder 41 and channel-coded by the channel CODEC 34. The voice data are then modulated by the modulator 35, amplified by the RF unit 32 and transmitted from the antenna 31 to the base station 2. When the user pushes the on-hook button on the input operation unit 46, the mobile communication terminal device 30 severs the connection.

If in step S99 mute mode is not judged selected, then the mobile communication terminal device 30 goes to step s102 and reproduces as a ring tone the music data that were downloaded from the server device 20 and stored in the storage unit 42. Specifically, the music data are retrieved from the storage unit 42, decoded by the decoder 36, and converted from digital to analog format by the D/A converter 37 before being output from the speaker 38. In step S103, the user pushes the off-hook button on the input operation unit 46 to let the mobile communication terminal device 30 establish a connection with the calling party. When the user pushes the on-hook button on the input operation unit 46, the mobile communication terminal device 30 severs the connection.

In step S104, the control unit 45 of the mobile communication terminal device 30 counts the number of times the music data downloaded from the server device and held in the storage unit 42 have been reproduced therefrom as the ring tone. In step S105, the mobile communication terminal device 30 transmits to the server device 20 the reproduction count of the music data during a predetermined period of time (e.g., one month). It should be noted that the data sent here by the terminal device 30 represent not an incoming call count but the music data reproduction count corresponding to the incoming calls during the predetermined period.

In step 5106, the server device 20 receives the music data reproduction count from the mobile communication terminal device 30. At this point, the server device 20 receives the music data reproduction counts from all mobile communication terminal devices 30 to which the music data in question have been distributed, and totals the counts from every terminal device 30 preparatory to informing the content providers of the total music data reproduction counts. In step S107, the total number of times the music data have been reproduced by each user is transmitted to the content provider terminal device 10. In step S108, each content provider terminal device 10 receives the total reproduction counts by the users of the music data it has offered. This informs the people concerned at the agencies, record companies or other establishments involved how their music data have been advertised, given the reported number of times the data have been reproduced as ring tones by the mobile communication terminal devices 30.

In step S109, the server device 20 generates discount data regarding each user's music data reproduction count on the mobile communication terminal device 30, and adds the data thus generated to the discount data reflecting the user's download count in order to compute total discount data for each user.

The server device 20 generates charge data for the content providers in the same manner as shown in Table 2 above.

After generating the users' total discount data and the content providers' charge data as described above, the server device 20 goes to step S110. In step S110, the charge server 20 transmits the user discount data to the central management device 50 for call fee discounts and the content provider charge data to the charge server device 60 for settlement of charges.

After detecting a call signal from any mobile communication terminal device 30 and establishing a connection therewith, the central management device 50 adds up a call fee in accordance with a call time that elapses on the terminal device 30 in question. In step S67 of FIG. 5 above, the central management device 50, having received from the server device 20 the users' total discount data on their mobile communication terminal devices 30, updates the users' call data illustratively once a month. That is, the central management device 50 deducts the total discount data from each user's call fees as shown in Table 6 in order to compute call data constituting the users' definitive call fees.

Following the steps in the flowchart of FIG. 4, the server device 20 transmits the content provider charge data to the charge server device 60 while the central management device 50 transmits the user charge data to the charge server device 60. In response, the charge server device 60 updates its database, i.e., records of dates, payment and deposit transactions and account balances, on the basis of the data from the server device 20 or from the central management device 50. That is, the charge server device 60 updates the content provider account data based on the charge data from the server device 20, and transfers the relevant amounts to the account of the administrator of the server device 20. The charge server device 60 also updates the user account data in keeping with the discount call data from the central management device 50 and transfers the relevant amounts to the account of the administrator of the central management device 50.

The above-described data transmission-reception system withholds discounts on the call fees of the users who put their terminal devices in mute mode to suppress the ring tone. The system thus provides discounts exactly proportionate to the number of times the music data have been reproduced by each user. In other words, the discounts the users get precisely reflect their contribution to the advertising campaign of the music data in question. Meanwhile, in the earlier description of step S104 in FIG. 7, the control unit 45 of the mobile communication terminal device 30 was shown counting the number of times the music data had been reproduced following the disconnection. However, this is not limitative of the invention. Alternatively, immediately after the music data in the storage unit 42 start being reproduced in step S102 under control of the control unit 45, the control unit 45 may start monitoring the music data reproduction count and detect a definitive reproduction count upon completion of the music data reproduction.

An even further variation of the data transmission-reception system 1 according to the invention will now be described with reference to FIGS. 8 and 9. This system involves allowing the user of the mobile communication terminal device 30 to select a desired music title from the music data downloaded for use as a ring tone. The user can make a choice by viewing a title screen on the display unit 47. The benefit for the user of the mobile communication terminal device 30 is twofold: the use of a desired piece of music as the ring tone, and a discount on call fees for using that particular piece of music. This system is the same in constitution as that of FIG. 1 and thus structural details of the system will not be discussed further.

In step S121 of FIG. 9, the content provider terminal device 10 uploads the music data to be advertised to the server device 20 together with the applicable provider ID and account data. In step S122, the server device 20 receives the data from the content provider terminal device 10 and updates its database accordingly. In step S123, the server device 20 discloses at its website the music data uploaded from the content provider. Illustratively, as shown in FIG. 8, the website displays music data titles in association with the IDs of the content providers offering them. The website may also display different discount rates, if any, of different music data as well as the names of TV commercials, dramas or movies that may be currently using the posted music data.

When downloading music data for use as a ring tone, the user operates the mobile communication terminal device 30 to access the website and have the relevant website page displayed on the display unit 47. The user may download and sample illustratively part of the music data before deciding on a particular piece of music data to be downloaded. Then the user operates the input operation unit 46 to select the desired piece of music data from the music data titles displayed on the display unit 47 of the mobile communication terminal device 30. A click on a "Download" button shown in FIG. 8 causes the terminal device 30 to transmit a download request signal to the server device 20 in step S124 requesting downloading of the selected music data from the latter. Along with the download request signal, the mobile communication terminal device 30 transmits such user data as the address, age, gender and bank account data to the server device 20. In step S125, the server device 20 receives the request signal and the user data and starts transmitting the selected music data to the mobile communication terminal device 30 accordingly. In step S126, the terminal device 30 starts downloading the music data. The music data are received by the antenna 31, amplified by the RF unit 32 and demodulated by the demodulator 33. The music data are extracted by the channel CODEC 34 from the demodulated data and stored into the storage unit 42.

With the music data downloaded, the mobile communication terminal device 30 goes to step S127 and transmits to the server device 20 a download-complete signal telling the latter that downloading of the music data has been completed. In step S128, the download-complete signal from the mobile communication terminal device 30 is received by the server device 20. In step S129, the server device 20 transmits a distribution-complete notice to the content provider terminal device 10 of the sponsor offering the music data in question. In step S130, the content provider terminal device 10 receives the distribution-complete notice from the server device 20. The notice informs the content provider that the music data have been distributed to the mobile communication terminal devices 30 owned by the specific users who meet predetermined distribution conditions where applicable.

In step S131, the server device 20 generates call fee discount data for the users of the mobile communication terminal devices 30 as shown in Table 1 above, and charge data for the content providers. Unlike the earlier examples, this system has no distribution conditions specifying users who would be allowed to download the music data. As a result, the charge server 20 charges the same amount on all content providers.

After downloading the music data from the server device 20 and now on standby, the mobile communication terminal device 30 reaches step S132. In step S132, the mobile communication terminal device 30 checks to see if any incoming call signal has been received from the base station 2. If an incoming call signal is judged detected from the base station 2, step S133 is reached; if no incoming call signal is judged detected, then step S132 is repeated.

On receiving an incoming call signal from the base station 2, the mobile communication terminal device 30 goes to step S133. In step S133, the terminal device 30 retrieves and reproduces as a ring tone the music data that have been stored in the storage unit 42 after being downloaded from the server device 20. The music data read from the storage unit 42 are decoded by the decoder 36. The decoded data are converted from digital to analog format by the D/A converter 37 before being output from the speaker 38.

In step S134, the user pushes the off-hook button on the input operation unit 46, causing the mobile communication terminal device 30 to establish a connection with the base station 2. Call data sent from the base station 2 are received by the antenna, amplified by the RF unit 32, and demodulated by the demodulator 33. The channel CODEC 34 extracts voice data from the demodulated data. The extracted voice data are decoded by the decoder 36 and converted to analog format by the D/A converter 37 before being output from the speaker 38. The voice spoken by the user is converted to an analog signal by the microphone 39 and converted to a digital signal by the A/D converter 40. The digitized voice data are encoded by the encoder 41 and channel-coded by the channel CODEC 34. The voice data are then modulated by the modulator 35, amplified by the RF unit 32 and transmitted from the antenna 31 to the base station 2. When the user pushes the on-hook button on the input operation unit 46, the mobile communication terminal device 30 severs the connection.

In step S135, the control unit 45 of the mobile communication terminal device 30 counts the number of times the music data downloaded from the server device and retrieved from the storage unit 42 have been reproduced as the ring tone. In step S136, the mobile communication terminal device 30 transmits to the server device 20 the reproduction count of the music data during a predetermined period of, say, one month.

In step S137, the server device 20 receives the music data reproduction count from the mobile communication terminal device 30. At this point, the server device 20 receives the music data reproduction counts from all mobile communication terminal devices 30 to which the music data in question have been distributed, and totals the counts from every terminal device 30 preparatory to informing the content providers of the total music data reproduction counts. In step S138, the total number of times the music data have been reproduced by each user is transmitted to the content provider terminal device 10. In step S139, each content provider terminal device 10 receives the total reproduction counts by the users of the music data it has offered. This informs the people concerned at the agencies, record companies or other establishments involved how their music data have been advertised, given the reported number of times the data have been reproduced as ring tones by the mobile communication terminal devices 30.

In step S140, the server device 20 generates discount data regarding each user's music data reproduction count on the mobile communication terminal device 30 as shown in Table 5 above, and adds the data thus generated to the discount data reflecting the user's download count in order to compute total discount data for each user.

After generating the users' total discount data and the content providers' charge data as described above, the server device 20 goes to step S141. In step S141, the charge server 20 transmits the user discount data to the central management device 50 for call fee discounts and the content provider charge data to the charge server device 60 for settlement of charges.

After detecting a call signal from any mobile communication terminal device 30 and establishing a connection therewith, the central management device 50 adds up a call fee in accordance with a call time that elapses on the terminal device 30 in question. In step S67 of FIG. 5 above, the central management device 50, having received from the server device 20 the users' total discount data on their mobile communication terminal devices 30, updates the users' call data illustratively once a month. That is, the central management device 50 deducts the total discount data from each user's call fees as shown in Table 6 in order to compute call data constituting the users' definitive call fees.

Following the steps in the flowchart of FIG. 4, the server device 20 transmits the content provider charge data to the charge server device 60 while the central management device 50 transmits the user charge data to the charge server device 60. In response, the charge server device 60 updates its database, i.e., records of dates, payment and deposit transactions and account balances, on the basis of the data from the server device 20 or from the central management device 50. That is, the charge server device 60 updates the content provider account data based on the charge data from the server device 20, and transfers the relevant amounts to the account of the administrator of the server device 20. The charge server device 60 also updates the user account data in keeping with the discount call data from the central management device 50 and transfers the relevant amounts to the account of the administrator of the central management device 50.

The above-described data transmission-reception system allows the users of the mobile communication terminal devices 30 to get further discounts on their call fees depending on the number of times they have reproduced music data, and permits the users to select desired titles of music data for use as ring tones. The additional discounts and the music title selection feature serve as a further incentive to promote widespread acceptance of this system. Meanwhile, in the earlier description of step S135 in FIG. 9, the control unit 45 of the mobile communication terminal device 30 was shown counting the number of times the music data had been retrieved and reproduced following the disconnection. However, this is not limitative of the invention. Alternatively, immediately after the music data in the storage unit 42 start being reproduced in step S133 under control of the control unit 45, the control unit 45 may count the number of times the music data have been retrieved and reproduced.

The content provider terminal devices 10 and the server device 20 are each constituted by a general-purpose computer. A program or programs making up the series of steps described above may be installed upon use into each of these computers for execution, carried by a suitable program storage medium such as an optical disc, a magneto-optical disc, a magnetic disc, or an IC card accommodating a semiconductor memory. The storage medium is loaded into an external storage unit connected to the drives 18 and 26 of the computers. Operating the drives 18 and 26 causes the computer programs to be retrieved from the external storage unit and installed onto the HD 11 or into the storage unit 21 for execution. The programs may alternatively be installed into the computers via the Internet 3, over a LAN (local area network) or via a satellite link. On the mobile communication terminal devices 30, an IC card is loaded into the drive 49 so that necessary programs are read from the card and installed into the storage unit 42. Obviously the programs may be installed into the terminal devices 30 over the Internet 3 or by way of similar networks.

The music data are transmitted and received rapidly over the Internet 3 when compressed by such methods as ATRAC3 (Adaptive Transform Acoustic Coding 3; trademark), MPEG-2AAC (Moving Picture Experts Group 2 Advanced Audio Coding; trademark), MP3 (MPEG-1 Audio Layer 3; trademark), TwinVQ (Transform-Domain Weighted Interleave Vector Quantization; trademark), MS Audio (WMA: Windows Media Audio; trademark), or Ogg Vorbis (trademark).

Alternatively, the music data may be replaced with promotion video data accompanied by music. In that case, upon receipt of an incoming call signal by the terminal device, the video data are displayed on the display unit 47 while the accompanying music is being reproduced as a ring tone. The promotion video data may be compressed by such methods as MPEG4 or MPEG7 for rapid transmission and reception.

As another alternative, the server device 20 and the charge server device 60 may be constituted by the same piece of equipment for purpose of simplification.

As described, the system and method according to the invention allow users of mobile communication terminal devices or like apparatuses to utilize as a musical ring tone the contents that content providers want broadly advertised. The use of music contents as ring tones on the terminal devices—overheard by people nearby in the streets over extensive areas—promises significantly enhanced effects of advertisement. The users of the terminal devices benefit from discounts on their call fees in proportion to their contribution to the advertising campaign. The inventive system can enjoy widespread acceptance by touting the benefit of call fee discounts and attracting more and more users thereby.

As many apparently different embodiments of this invention may be made without departing from the spirit and scope thereof, it is to be understood that the invention is not limited to the specific embodiments thereof except as defined in the appended claims.

What is claimed is:

1. A data communication system comprising:
   a first terminal device configured to transmit content and content provider identification data identifying the provider of the content;
   a server device configured to receive and store the transmitted content and content provider identification data; and
   a second terminal device configured to transmit user identification data to the server device, configured to receive and store the content from the server device based on the user identification data, and configured to reproduce the stored content upon detection of an incoming call;
   wherein the server device stores first account information corresponding to the content provider identification data and second account information corresponding to the user identification data, the server device incrementing first amount information in the first account information when receiving the content from the first terminal device, the server device decrementing second amount information in the second account information when transmitting the content to the second terminal device; and the server device decrementing a larger second amount information in response to a higher reproduction audio volume of the content on the second terminal device.

2. A data communication system according to claim 1, wherein the first account information includes first account data corresponding to the content provider identification data and the second account information includes second account data corresponding to the user identification data;
   wherein the server device comprises a communication unit configured to transmit the first and second account information to an external settlement center, the server device thereby prompting the external settlement center through the communication unit to settle account balances corresponding to the first account data based on the amounts represented by the first amount information and to settle account balances corresponding to the second account data based on the amounts represented by the second amount information.

3. A data communication system according to claim 1, wherein the second terminal device comprises:
a storing unit configured to store the content transmitted from the server device;
a reproducing unit configured to retrieve the content from the storing unit and reproduce the retrieved content;
an incoming call detecting unit configured to detect an incoming call from a third terminal device; and
a controlling unit configured to, if the incoming call detecting unit detects an incoming call from a third terminal device, cause the reproducing unit to reproduce the content; configured to establish a connection with the third terminal device in response to an operation performed by a user while the content is being reproduced; and configured to terminate the reproduction of the content once the connection with the third terminal device is established.

4. A data communication system according to claim 3, wherein the server device makes a larger decrement in the second amount information the greater the number of times the content has been reproduced on the second terminal device.

5. A data communication system according to claim 1, wherein the server device decrements the second amount information only if the reproduction audio volume of the content on the second terminal device is greater than zero.

6. A data communication system according to claim 1, wherein the second terminal device comprises:
a counting unit configured to count the number of times the content has been reproduced by the reproducing unit; and
an accumulating unit configured to accumulate the reproduction audio volume in effect whenever the content is reproduced by the reproducing unit;
wherein, in each predetermined period of time, the controlling unit takes a counting result of the counting unit as the number of times the contents have been reproduced and transmits the number of times to the server device; and the controlling unit takes a division result of dividing an accumulation result of the accumulating unit by the counting result as a content reproduction audio volume and transmits the content reproduction volume to the server device.

7. A data communication system according to claim 1, wherein the server device selects user identification data from the second terminal device based upon distribution conditions applicable to the content transmitted from the first terminal device, and the server device transmits the content to the second terminal device.

8. A data communication system according to claim 1, wherein the server device returns a content list to the second terminal device in response to access therefrom; and
wherein the second terminal device has a selecting unit configured to select from the content list a content desired to be downloaded.

9. A data communication system according to claim 1, wherein the second terminal device comprises a delete inhibit controlling unit configured to inhibit deletion of a content transmitted from the server device.

10. A data communication system according to claim 1, wherein the content is music data.

11. A data communication system according to claim 1, wherein the content is promotion video data.

12. A data communication system according to claim 1, wherein the provider is a content sponsor.

13. A data communication system according to claim 1, wherein the second terminal device comprises a mobile communication terminal device.

14. A date communication system according to claim 1, wherein the second terminal device comprises a plurality of portable telephones.

15. A communication terminal device comprising:
a communicating unit configured to transmit user identification data to a server device and exchange call data with the server device;
a storing unit configured to store content offered by content provider and transmitted from the server device in accordance with the user identification data;
a reproducing unit configured to reproduce the content; and
a controlling unit configured to retrieve the content from the storing unit upon detection of incoming call data, cause the reproducing unit to reproduce the retrieved content, and cause the communicating unit to transmit to the server device a reproducing audio volume of the content reproduced by the reproducing unit.

16. A communication terminal device according to claim 15, wherein the controlling unit causes the reproducing unit to reproduce the content upon detection of incoming call data from a second terminal device; proceeds to establish a connection with the second terminal device in response to an operation performed by a user while the content is being reproduced; and terminates the reproduction of the content once the connection with the second terminal device is established.

17. A communication terminal device according to claim 16, wherein the controlling unit causes the communicating unit to transmit to the server device the number of times the content has been reproduced by the reproducing unit.

18. A communication terminal device according to claim 17, further comprising:
a counting unit configured to count the number of times the content has been reproduced by the reproducing unit; and
an accumulating unit configured to accumulate the reproduction audio volume in effect whenever the content is reproduced by the reproducing unit;
wherein, in each predetermined period of time, the controlling unit takes a counting result of the counting unit as the number of times the contents have been reproduced and transmits the number of times to the server device; and the controlling unit takes a division result of dividing an accumulation result of the accumulating unit by the counting result as a content reproduction volume and transmits the content reproduction audio volume to the server device.

19. A communication terminal device according to claim 15, wherein the controlling unit causes the communicating unit to transmit to the server device a request signal requesting the server device to transmit a content list; and
the communication terminal device further comprises a selecting unit configured to select a content desired to be downloaded from the content list transmitted from the server device in response to the request signal.

20. A communication terminal device according to claim 15, further comprising a delete inhibit controlling unit configured to inhibit deletion from the storing unit of a content transmitted from the server device.

21. A communication terminal device according to claim 15, wherein the content is music data.

22. A communication terminal device according to claim 15, wherein the content is promotion video data.

23. A communication terminal device according to claim 15, wherein the provider is a content sponsor.

24. A communication terminal device according to claim 15, wherein the communication terminal device comprises a mobile communication terminal device.

25. A communication terminal device according to claim 15, wherein the communication terminal device comprises a plurality of portable telephones.

26. A data communication method comprising the steps of:
allowing a first terminal device to transmit to a server device a content and content provider identification data identifying the provider of said content;
allowing a second terminal device to transmit user identification data to said server device;
allowing said server device to receive and store said content, said content provider identification data, and said user identification data;
allowing said server device which stores first account information corresponding to said content provider identification data and second account information corresponding to said user identification data; to increment first amount information in said first account information when receiving said content from said first terminal device; to transmit said content to said second terminal device based on said user identification data; to decrement second amount information in said second account information upon transmission of said content to said second terminal device; and to decrement a larger second amount information in response to a higher reproduction audio volume of the content on the second terminal device;
allowing said second terminal device to receive and store the transmitted content; and
allowing said second terminal device to reproduce said content upon detection of an incoming call.

27. A data communication method comprising the steps of:
allowing a server device to receive from a first terminal device a content and content provider identification data identifying the provider of said content, and to receive and store user identification data from a second terminal device; and
allowing said server device which stores first account information corresponding to said content provider identification data and second account information corresponding to said user identification data; to increment first amount information in said first account information when receiving said content from said first terminal device; to transmit said content to said second terminal device based on said user identification data; to decrement second amount information in said second account information upon transmission of said content to said second terminal device; and to decrement a larger second amount information in response to a higher reproduction audio volume of the content on the second terminal device.

28. A data communication method comprising the steps of:
allowing a communication terminal device to transmit user identification data to a server device;
allowing the communication terminal device to store a content offered by a content provider and transmitted from the server device in accordance with the user identification data;
allowing the communication terminal device to retrieve the stored content upon detection of incoming call data and to reproduce the retrieved content; and
allowing the communication terminal device to transmit a reproducing audio volume of the retrieved content to the server device.

29. A computer readable storage medium storing a computer program code, which when executes, performs the steps of:
allowing a communication terminal device to transmit user identification data to a server device;
allowing the communication terminal device to store a content offered by a content provider and transmitted from the server device in accordance with the user identification data;
allowing the communication terminal device to retrieve the stored content upon detection of incoming call data and to reproduce the retrieved content; and
allowing the communication terminal device to transmit a reproducing audio volume of the retrieved content to the server device.

* * * * *

UNITED STATES PATENT AND TRADEMARK OFFICE
CERTIFICATE OF CORRECTION

| | | |
|---|---|---|
| PATENT NO. | : 7,379,760 B2 | Page 1 of 1 |
| APPLICATION NO. | : 10/037329 | |
| DATED | : May 25, 2008 | |
| INVENTOR(S) | : Ashii | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1965 days.

Signed and Sealed this

Twenty-eighth Day of September, 2010

David J. Kappos
*Director of the United States Patent and Trademark Office*